US012640148B2

(12) United States Patent
Smith et al.

(10) Patent No.: US 12,640,148 B2
(45) Date of Patent: May 26, 2026

(54) NETWORK MICROPHONE DEVICE WITH COMMAND KEYWORD CONDITIONING

(71) Applicant: Sonos, Inc., Santa Barbara, CA (US)

(72) Inventors: Connor Smith, New Hudson, MI (US); John Tolomei, Renton, WA (US); Kurt Soto, Ventura, CA (US)

(73) Assignee: Sonos, Inc., Santa Barbara, CA (US)

( * ) Notice: Subject to any disclaimer, the term of this patent is extended or adjusted under 35 U.S.C. 154(b) by 433 days.

(21) Appl. No.: 18/052,698

(22) Filed: Nov. 4, 2022

(65) Prior Publication Data

US 2023/0274738 A1 Aug. 31, 2023

Related U.S. Application Data

(63) Continuation of application No. 16/812,758, filed on Mar. 9, 2020, now Pat. No. 11,501,773, which is a
(Continued)

(51) Int. Cl.
| | |
|---|---|
| *G10L 15/22* | (2006.01) |
| *G06F 3/16* | (2006.01) |
| *G10L 15/08* | (2006.01) |

(52) U.S. Cl.
CPC .............. *G10L 15/22* (2013.01); *G06F 3/165* (2013.01); *G06F 3/167* (2013.01); *G10L 15/08* (2013.01);
(Continued)

(58) Field of Classification Search
None
See application file for complete search history.

(56) References Cited

U.S. PATENT DOCUMENTS

| | | | |
|---|---|---|---|
| 999,715 A | 8/1911 | Gundersen | |
| 5,692,104 A * | 11/1997 | Chow ..................... | G10L 25/87 |
| | | | 704/E11.005 |

(Continued)

FOREIGN PATENT DOCUMENTS

| | | |
|---|---|---|
| CN | 1748250 A | 3/2006 |
| CN | 1781291 A | 5/2006 |

(Continued)

OTHER PUBLICATIONS

Varela ó, San-Segundo R, Hernández LA. Combining pulse-based features for rejecting far-field speech in a HMM-based voice activity detector. Computers & Electrical Engineering. Jul. 1, 2011;37(4):589-600. (Year: 2011).*
(Continued)

*Primary Examiner* — Jonathan C Kim
(74) *Attorney, Agent, or Firm* — FORTEM IP LLP

(57) ABSTRACT

In one aspect, a playback device includes a voice assistant service (VAS) wake-word engine and a command keyword engine. The playback device detects, via the command keyword engine, a first command keyword, and determines whether one or more playback conditions corresponding to the first command keyword are satisfied. Based on (a) detecting the first command keyword and (b) determining that the one or more playback conditions corresponding to the first command keyword are satisfied, the playback device playback device performs a first playback command corresponding to the first command keyword. When the playback device detects, via the wake-word engine, a wake-word in voice input, the playback device streams sound data corresponding to at least a portion of the voice input to one or more remote servers associated with the VAS.

20 Claims, 20 Drawing Sheets

Related U.S. Application Data continuation of application No. 16/439,009, filed on Jun. 12, 2019, now Pat. No. 10,586,540.

(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 5,717,768 A | 2/1998 | Laroche | |
| 5,857,172 A | 1/1999 | Rozak | |
| 6,055,497 A * | 4/2000 | Hallkvist | G10L 25/78 |
| | | | 714/747 |
| 6,070,140 A | 5/2000 | Tran | |
| 6,219,645 B1 | 4/2001 | Byers | |
| 6,937,977 B2 | 8/2005 | Gerson | |
| 7,103,542 B2 | 9/2006 | Doyle | |
| 7,516,068 B1 | 4/2009 | Clark | |
| 7,705,565 B2 | 4/2010 | Patino et al. | |
| 8,325,909 B2 | 12/2012 | Tashev et al. | |
| 8,473,618 B2 | 6/2013 | Spear et al. | |
| 8,594,320 B2 | 11/2013 | Faller | |
| 8,620,232 B2 | 12/2013 | Helsloot | |
| 8,639,214 B1 | 1/2014 | Fujisaki | |
| 8,676,273 B1 | 3/2014 | Fujisaki | |
| 8,762,156 B2 | 6/2014 | Chen | |
| 8,898,063 B1 | 11/2014 | Sykes et al. | |
| 9,002,024 B2 | 4/2015 | Nakadai et al. | |
| 9,047,857 B1 | 6/2015 | Barton | |
| 9,070,367 B1 | 6/2015 | Hoffmeister et al. | |
| 9,088,336 B2 | 7/2015 | Mani et al. | |
| 9,098,467 B1 | 8/2015 | Blanksteen et al. | |
| 9,183,845 B1 | 11/2015 | Gopalakrishnan et al. | |
| 9,208,785 B2 | 12/2015 | Ben-David et al. | |
| 9,313,317 B1 | 4/2016 | Lebeau et al. | |
| 9,354,687 B2 | 5/2016 | Bansal et al. | |
| 9,368,105 B1 | 6/2016 | Freed et al. | |
| 9,418,651 B2 * | 8/2016 | Clark | G10L 15/063 |
| 9,491,033 B1 | 11/2016 | Soyannwo et al. | |
| 9,514,747 B1 | 12/2016 | Bisani et al. | |
| 9,542,941 B1 | 1/2017 | Weksler et al. | |
| 9,558,755 B1 | 1/2017 | Laroche et al. | |
| 9,632,748 B2 | 4/2017 | Faaborg et al. | |
| 9,640,194 B1 | 5/2017 | Nemala et al. | |
| 9,672,812 B1 | 6/2017 | Watanabe et al. | |
| 9,691,384 B1 | 6/2017 | Wang et al. | |
| 9,706,320 B2 | 7/2017 | Starobin et al. | |
| 9,749,738 B1 | 8/2017 | Adsumilli et al. | |
| 9,756,422 B2 | 9/2017 | Paquier et al. | |
| 9,767,786 B2 | 9/2017 | Starobin et al. | |
| 9,779,725 B2 | 10/2017 | Sun et al. | |
| 9,781,532 B2 | 10/2017 | Sheen | |
| 9,799,330 B2 | 10/2017 | Nemala et al. | |
| 9,812,128 B2 | 11/2017 | Mixter et al. | |
| 9,818,407 B1 | 11/2017 | Secker-Walker et al. | |
| 9,865,264 B2 | 1/2018 | Gelfenbeyn et al. | |
| 9,875,740 B1 | 1/2018 | Kumar et al. | |
| 9,898,250 B1 | 2/2018 | Williams et al. | |
| 9,899,021 B1 | 2/2018 | Vitaladevuni et al. | |
| 9,947,316 B2 * | 4/2018 | Millington | H04R 27/00 |
| 9,972,343 B1 | 5/2018 | Thorson et al. | |
| 9,992,642 B1 | 6/2018 | Rapp et al. | |
| 10,028,069 B1 | 7/2018 | Lang | |
| 10,038,419 B1 | 7/2018 | Elliot et al. | |
| 10,115,400 B2 | 10/2018 | Wilberding | |
| 10,134,398 B2 | 11/2018 | Sharifi | |
| 10,134,399 B2 | 11/2018 | Lang et al. | |
| 10,152,969 B2 | 12/2018 | Reilly et al. | |
| 10,186,276 B2 | 1/2019 | Dewasurendra et al. | |
| 10,204,624 B1 | 2/2019 | Knudson et al. | |
| 10,249,205 B2 | 4/2019 | Hammersley et al. | |
| 10,304,440 B1 | 5/2019 | Panchapagesan et al. | |
| 10,304,475 B1 | 5/2019 | Wang et al. | |
| 10,318,236 B1 | 6/2019 | Pal et al. | |
| 10,332,508 B1 | 6/2019 | Hoffmeister | |
| 10,346,122 B1 * | 7/2019 | Morgan | G06F 3/0484 |
| 10,354,658 B2 | 7/2019 | Wilberding | |
| 10,424,296 B2 | 9/2019 | Penilla et al. | |
| 10,499,146 B2 * | 12/2019 | Lang | H04L 12/2803 |
| 10,565,998 B2 | 2/2020 | Wilberding | |
| 10,565,999 B2 | 2/2020 | Wilberding | |
| 10,586,534 B1 | 3/2020 | Argyropoulos et al. | |
| 10,593,328 B1 | 3/2020 | Wang et al. | |
| 10,593,330 B2 | 3/2020 | Sharifi | |
| 10,699,711 B2 | 6/2020 | Reilly | |
| 10,720,173 B2 | 7/2020 | Freeman et al. | |
| 10,735,870 B2 | 8/2020 | Ballande et al. | |
| 10,746,840 B1 | 8/2020 | Barton et al. | |
| 10,777,203 B1 * | 9/2020 | Pasko | G06F 3/167 |
| 10,789,041 B2 | 9/2020 | Kim et al. | |
| 10,824,682 B2 | 11/2020 | Alvares et al. | |
| 10,825,471 B2 | 11/2020 | Walley et al. | |
| 10,837,667 B2 | 11/2020 | Nelson et al. | |
| 10,847,137 B1 | 11/2020 | Mandal et al. | |
| 10,847,164 B2 | 11/2020 | Wilberding | |
| 10,867,604 B2 | 12/2020 | Smith et al. | |
| 10,871,943 B1 | 12/2020 | D'Amato et al. | |
| 10,878,811 B2 | 12/2020 | Smith et al. | |
| 10,964,314 B2 | 3/2021 | Jazi et al. | |
| 11,024,311 B2 | 6/2021 | Mixter et al. | |
| 11,025,569 B2 | 6/2021 | Lind et al. | |
| 11,050,615 B2 | 6/2021 | Mathews et al. | |
| 11,062,705 B2 | 7/2021 | Watanabe et al. | |
| 11,100,923 B2 | 8/2021 | Fainberg et al. | |
| 11,137,979 B2 | 10/2021 | Plagge | |
| 11,138,969 B2 | 10/2021 | D'Amato | |
| 11,159,878 B1 | 10/2021 | Chatlani et al. | |
| 11,172,328 B2 | 11/2021 | Soto et al. | |
| 11,172,329 B2 | 11/2021 | Soto et al. | |
| 11,175,880 B2 | 11/2021 | Liu et al. | |
| 11,184,704 B2 | 11/2021 | Jarvis et al. | |
| 11,206,052 B1 | 12/2021 | Park et al. | |
| 11,212,612 B2 | 12/2021 | Lang et al. | |
| 11,264,019 B2 | 3/2022 | Bhattacharya et al. | |
| 11,277,512 B1 | 3/2022 | Leeds et al. | |
| 11,315,556 B2 | 4/2022 | Smith et al. | |
| 11,354,092 B2 | 6/2022 | D'Amato et al. | |
| 11,361,763 B1 | 6/2022 | Maas et al. | |
| 11,373,645 B1 | 6/2022 | Mathew et al. | |
| 11,411,763 B2 | 8/2022 | Mackay et al. | |
| 11,445,301 B2 | 9/2022 | Park et al. | |
| 11,514,898 B2 | 11/2022 | Millington | |
| 11,531,520 B2 | 12/2022 | Wilberding | |
| 2002/0054685 A1 | 5/2002 | Avendano et al. | |
| 2002/0055950 A1 | 5/2002 | Witteman | |
| 2002/0143532 A1 | 10/2002 | McLean et al. | |
| 2002/0184015 A1 * | 12/2002 | Li | G10L 25/78 |
| | | | 704/E11.003 |
| 2004/0093219 A1 | 5/2004 | Shin et al. | |
| 2004/0153321 A1 | 8/2004 | Chung et al. | |
| 2004/0161082 A1 | 8/2004 | Brown et al. | |
| 2005/0077843 A1 * | 4/2005 | Benditt | H05B 47/155 |
| | | | 315/312 |
| 2005/0201254 A1 * | 9/2005 | Looney | G06F 16/64 |
| | | | 369/124.01 |
| 2006/0217976 A1 * | 9/2006 | Gao | G10L 25/78 |
| | | | 704/214 |
| 2007/0033043 A1 | 2/2007 | Hyakumoto | |
| 2007/0038461 A1 | 2/2007 | Abbott et al. | |
| 2007/0071206 A1 * | 3/2007 | Gainsboro | H04M 3/42221 |
| | | | 379/168 |
| 2007/0201639 A1 | 8/2007 | Park et al. | |
| 2008/0160977 A1 | 7/2008 | Ahmaniemi et al. | |
| 2008/0192946 A1 | 8/2008 | Faller | |
| 2008/0221897 A1 | 9/2008 | Cerra et al. | |
| 2008/0291916 A1 | 11/2008 | Xiong et al. | |
| 2009/0013255 A1 | 1/2009 | Yuschik et al. | |
| 2009/0113053 A1 | 4/2009 | Van Wie et al. | |
| 2009/0214048 A1 | 8/2009 | Stokes, III et al. | |
| 2009/0299745 A1 | 12/2009 | Kennewick et al. | |
| 2009/0323924 A1 | 12/2009 | Tashev et al. | |
| 2010/0070276 A1 | 3/2010 | Wasserblat et al. | |

(56)                    References Cited

U.S. PATENT DOCUMENTS

| | | | |
|---|---|---|---|
| 2010/0103776 A1* | 4/2010 | Chan | H04R 3/005 |
| | | | 367/129 |
| 2010/0260348 A1 | 10/2010 | Bhow et al. | |
| 2010/0299639 A1 | 11/2010 | Ramsay et al. | |
| 2010/0329472 A1 | 12/2010 | Nakadai et al. | |
| 2010/0332236 A1 | 12/2010 | Tan | |
| 2011/0019833 A1 | 1/2011 | Kuech et al. | |
| 2011/0153326 A1* | 6/2011 | Garudadri | G10L 15/30 |
| | | | 704/E15.001 |
| 2011/0176687 A1 | 7/2011 | Birkenes | |
| 2011/0267985 A1 | 11/2011 | Wilkinson et al. | |
| 2012/0009906 A1 | 1/2012 | Patterson et al. | |
| 2012/0020485 A1 | 1/2012 | Visser et al. | |
| 2012/0027218 A1 | 2/2012 | Every et al. | |
| 2012/0076308 A1 | 3/2012 | Kuech et al. | |
| 2012/0078635 A1 | 3/2012 | Rothkopf et al. | |
| 2012/0224457 A1 | 9/2012 | Kim et al. | |
| 2012/0237047 A1 | 9/2012 | Neal et al. | |
| 2012/0245941 A1 | 9/2012 | Cheyer | |
| 2012/0265528 A1 | 10/2012 | Gruber et al. | |
| 2013/0073293 A1 | 3/2013 | Jang et al. | |
| 2013/0080146 A1 | 3/2013 | Kato et al. | |
| 2013/0080167 A1 | 3/2013 | Mozer | |
| 2013/0080171 A1 | 3/2013 | Mozer et al. | |
| 2013/0129100 A1 | 5/2013 | Sorensen | |
| 2013/0183944 A1* | 7/2013 | Mozer | H04L 12/2818 |
| | | | 455/414.1 |
| 2013/0185639 A1 | 7/2013 | Lim | |
| 2013/0230184 A1 | 9/2013 | Kuech et al. | |
| 2013/0238326 A1 | 9/2013 | Kim et al. | |
| 2013/0283169 A1 | 10/2013 | Van Wie | |
| 2013/0289994 A1 | 10/2013 | Newman et al. | |
| 2013/0294611 A1 | 11/2013 | Yoo et al. | |
| 2013/0301840 A1 | 11/2013 | Yemdji et al. | |
| 2013/0317783 A1* | 11/2013 | Tennant | G10L 21/0208 |
| | | | 702/191 |
| 2013/0322634 A1 | 12/2013 | Bennett et al. | |
| 2013/0336499 A1 | 12/2013 | Beckhardt et al. | |
| 2013/0339028 A1 | 12/2013 | Rosner et al. | |
| 2014/0006825 A1 | 1/2014 | Shenhav | |
| 2014/0056435 A1 | 2/2014 | Kjems et al. | |
| 2014/0064476 A1 | 3/2014 | Mani et al. | |
| 2014/0075311 A1* | 3/2014 | Boettcher | G06F 3/017 |
| | | | 715/716 |
| 2014/0108010 A1 | 4/2014 | Maltseff et al. | |
| 2014/0126745 A1 | 5/2014 | Dickins et al. | |
| 2014/0159581 A1 | 6/2014 | Pruemmer et al. | |
| 2014/0161263 A1 | 6/2014 | Koishida et al. | |
| 2014/0172899 A1* | 6/2014 | Hakkani-Tur | G06F 16/24534 |
| | | | 707/759 |
| 2014/0181199 A1 | 6/2014 | Kumar et al. | |
| 2014/0188476 A1 | 7/2014 | Li et al. | |
| 2014/0200881 A1 | 7/2014 | Chatlani | |
| 2014/0214429 A1 | 7/2014 | Pantel | |
| 2014/0229959 A1 | 8/2014 | Beckhardt et al. | |
| 2014/0244269 A1 | 8/2014 | Tokutake | |
| 2014/0270216 A1 | 9/2014 | Tsilfidis et al. | |
| 2014/0274203 A1* | 9/2014 | Ganong, III | G10L 15/02 |
| | | | 455/563 |
| 2014/0278343 A1 | 9/2014 | Tran | |
| 2014/0288686 A1 | 9/2014 | Sant et al. | |
| 2014/0328490 A1 | 11/2014 | Mohammad et al. | |
| 2014/0363022 A1 | 12/2014 | Dizon et al. | |
| 2014/0364089 A1 | 12/2014 | Lienhart et al. | |
| 2014/0365225 A1 | 12/2014 | Haiut | |
| 2014/0368734 A1 | 12/2014 | Hoffert et al. | |
| 2015/0032443 A1 | 1/2015 | Karov et al. | |
| 2015/0032456 A1 | 1/2015 | Wait | |
| 2015/0039310 A1 | 2/2015 | Clark et al. | |
| 2015/0039311 A1 | 2/2015 | Clark et al. | |
| 2015/0073807 A1 | 3/2015 | Kumar | |
| 2015/0126255 A1 | 5/2015 | Yang et al. | |
| 2015/0154953 A1 | 6/2015 | Bapat et al. | |
| 2015/0221307 A1 | 8/2015 | Shah et al. | |
| 2015/0365762 A1* | 12/2015 | Truon | H04R 3/04 |
| | | | 381/71.1 |
| 2015/0373100 A1 | 12/2015 | Kravets et al. | |
| 2015/0382128 A1 | 12/2015 | Ridihalgh et al. | |
| 2016/0027440 A1 | 1/2016 | Gelfenbeyn et al. | |
| 2016/0034448 A1 | 2/2016 | Tran | |
| 2016/0055847 A1 | 2/2016 | Dahan | |
| 2016/0066087 A1 | 3/2016 | Solbach et al. | |
| 2016/0077794 A1 | 3/2016 | Kim et al. | |
| 2016/0093281 A1 | 3/2016 | Kuo et al. | |
| 2016/0134924 A1 | 5/2016 | Bush et al. | |
| 2016/0148612 A1 | 5/2016 | Guo et al. | |
| 2016/0171976 A1* | 6/2016 | Sun | H04W 52/0251 |
| | | | 704/254 |
| 2016/0212488 A1 | 7/2016 | Os et al. | |
| 2016/0253050 A1* | 9/2016 | Mishra | G06F 16/9577 |
| | | | 715/727 |
| 2016/0299737 A1 | 10/2016 | Clayton et al. | |
| 2016/0322045 A1 | 11/2016 | Hatfield et al. | |
| 2016/0379632 A1* | 12/2016 | Hoffmeister | G10L 25/87 |
| | | | 704/253 |
| 2016/0379634 A1 | 12/2016 | Yamamoto et al. | |
| 2016/0379635 A1 | 12/2016 | Page | |
| 2017/0083606 A1 | 3/2017 | Mohan | |
| 2017/0084278 A1 | 3/2017 | Jung | |
| 2017/0110130 A1 | 4/2017 | Sharifi et al. | |
| 2017/0140750 A1 | 5/2017 | Wang et al. | |
| 2017/0140757 A1 | 5/2017 | Penilla et al. | |
| 2017/0140759 A1 | 5/2017 | Kumar et al. | |
| 2017/0164139 A1 | 6/2017 | Deselaers et al. | |
| 2017/0186425 A1 | 6/2017 | Dawes et al. | |
| 2017/0186427 A1 | 6/2017 | Wang et al. | |
| 2017/0242653 A1* | 8/2017 | Lang | H04L 12/2809 |
| 2017/0242656 A1 | 8/2017 | Plagge et al. | |
| 2017/0242657 A1* | 8/2017 | Jarvis | G10L 17/22 |
| 2017/0243576 A1* | 8/2017 | Millington | G10L 15/30 |
| 2017/0243587 A1 | 8/2017 | Plagge et al. | |
| 2017/0245076 A1 | 8/2017 | Kusano et al. | |
| 2017/0269900 A1 | 9/2017 | Triplett | |
| 2017/0270919 A1 | 9/2017 | Parthasarathi et al. | |
| 2017/0300289 A1 | 10/2017 | Gattis | |
| 2017/0329397 A1 | 11/2017 | Lin | |
| 2017/0357390 A1 | 12/2017 | Alonso Ruiz et al. | |
| 2017/0364371 A1* | 12/2017 | Nandi | G06F 16/24565 |
| 2017/0365247 A1 | 12/2017 | Ushakov | |
| 2018/0012077 A1 | 1/2018 | Laska et al. | |
| 2018/0025732 A1* | 1/2018 | Lepauloux | G10L 25/81 |
| | | | 704/210 |
| 2018/0033429 A1 | 2/2018 | Makke et al. | |
| 2018/0040324 A1 | 2/2018 | Wilberding | |
| 2018/0061396 A1 | 3/2018 | Srinivasan et al. | |
| 2018/0061409 A1 | 3/2018 | Valentine et al. | |
| 2018/0091913 A1 | 3/2018 | Hartung et al. | |
| 2018/0096678 A1 | 4/2018 | Zhou et al. | |
| 2018/0137857 A1 | 5/2018 | Zhou et al. | |
| 2018/0139512 A1 | 5/2018 | Moran et al. | |
| 2018/0182410 A1 | 6/2018 | Kaskari et al. | |
| 2018/0190285 A1* | 7/2018 | Heckmann | G10L 15/22 |
| 2018/0196776 A1 | 7/2018 | Hershko et al. | |
| 2018/0199130 A1 | 7/2018 | Jaffe et al. | |
| 2018/0210698 A1* | 7/2018 | Park | G06F 3/165 |
| 2018/0233137 A1* | 8/2018 | Torok | G06F 3/167 |
| 2018/0233139 A1* | 8/2018 | Finkelstein | A61B 5/0507 |
| 2018/0233141 A1* | 8/2018 | Solomon | G06V 40/167 |
| 2018/0260680 A1* | 9/2018 | Finkelstein | G06N 5/04 |
| 2018/0270573 A1 | 9/2018 | Lang et al. | |
| 2018/0277113 A1 | 9/2018 | Hartung et al. | |
| 2018/0293221 A1* | 10/2018 | Finkelstein | G06N 20/00 |
| 2018/0301147 A1 | 10/2018 | Kim | |
| 2018/0330727 A1 | 11/2018 | Tulli | |
| 2018/0336892 A1 | 11/2018 | Kim et al. | |
| 2018/0350356 A1 | 12/2018 | Garcia | |
| 2018/0350379 A1 | 12/2018 | Wung et al. | |
| 2018/0352014 A1 | 12/2018 | Alsina et al. | |
| 2018/0352334 A1 | 12/2018 | Family et al. | |
| 2018/0358019 A1 | 12/2018 | Mont-Reynaud | |
| 2019/0019112 A1* | 1/2019 | Gelfenbeyn | H04L 12/1827 |
| 2019/0035404 A1 | 1/2019 | Gabel et al. | |
| 2019/0037173 A1 | 1/2019 | Lee | |

(56) References Cited

U.S. PATENT DOCUMENTS

| | | | |
|---|---|---|---|
| 2019/0044745 A1 | 2/2019 | Knudson et al. | |
| 2019/0066680 A1 | 2/2019 | Woo et al. | |
| 2019/0066710 A1 | 2/2019 | Bryan et al. | |
| 2019/0073999 A1 | 3/2019 | Prémont et al. | |
| 2019/0108839 A1 | 4/2019 | Reilly et al. | |
| 2019/0122662 A1 | 4/2019 | Chang et al. | |
| 2019/0130906 A1 | 5/2019 | Kobayashi et al. | |
| 2019/0156818 A1* | 5/2019 | Piersol | G10L 25/87 |
| 2019/0156847 A1 | 5/2019 | Bryan et al. | |
| 2019/0172452 A1 | 6/2019 | Smith et al. | |
| 2019/0172467 A1 | 6/2019 | Kim et al. | |
| 2019/0172476 A1 | 6/2019 | Wung et al. | |
| 2019/0179607 A1* | 6/2019 | Thangarathnam | G10L 15/1815 |
| 2019/0186937 A1 | 6/2019 | Sharifi et al. | |
| 2019/0188328 A1* | 6/2019 | Oyenan | G06F 16/9535 |
| 2019/0189117 A1* | 6/2019 | Kumar | G06F 16/3329 |
| 2019/0206405 A1* | 7/2019 | Gillespie | G06Q 30/0201 |
| 2019/0206412 A1 | 7/2019 | Li et al. | |
| 2019/0222756 A1* | 7/2019 | Moloney | H04N 23/45 |
| 2019/0237089 A1 | 8/2019 | Shin | |
| 2019/0251960 A1 | 8/2019 | Maker et al. | |
| 2019/0259408 A1 | 8/2019 | Freeman et al. | |
| 2019/0281387 A1 | 9/2019 | Woo et al. | |
| 2019/0287536 A1 | 9/2019 | Sharifi et al. | |
| 2019/0295533 A1* | 9/2019 | Wang | G10L 15/22 |
| 2019/0295555 A1 | 9/2019 | Wilberding | |
| 2019/0295556 A1 | 9/2019 | Wilberding | |
| 2019/0311715 A1 | 10/2019 | Pfeffinger et al. | |
| 2019/0311718 A1 | 10/2019 | Huber et al. | |
| 2019/0311722 A1 | 10/2019 | Caldwell | |
| 2019/0318729 A1 | 10/2019 | Chao et al. | |
| 2019/0325870 A1 | 10/2019 | Mitic | |
| 2019/0325888 A1 | 10/2019 | Geng | |
| 2019/0341037 A1 | 11/2019 | Bromand et al. | |
| 2019/0341038 A1 | 11/2019 | Bromand et al. | |
| 2019/0371324 A1 | 12/2019 | Powell et al. | |
| 2019/0371342 A1 | 12/2019 | Tukka et al. | |
| 2019/0392832 A1 | 12/2019 | Mitsui et al. | |
| 2020/0043489 A1 | 2/2020 | Bradley et al. | |
| 2020/0110571 A1 | 4/2020 | Liu et al. | |
| 2020/0125162 A1 | 4/2020 | D'Amato et al. | |
| 2020/0128317 A1* | 4/2020 | Feldman | H04R 1/083 |
| 2020/0135194 A1 | 4/2020 | Jeong | |
| 2020/0135224 A1* | 4/2020 | Bromand | G10L 21/0232 |
| 2020/0184980 A1 | 6/2020 | Wilberding | |
| 2020/0244650 A1 | 7/2020 | Burris et al. | |
| 2020/0312315 A1* | 10/2020 | Li | G10L 15/22 |
| 2020/0342869 A1 | 10/2020 | Lee et al. | |
| 2020/0395013 A1* | 12/2020 | Smith | G06F 3/165 |
| 2020/0409926 A1 | 12/2020 | Srinivasan et al. | |
| 2021/0118439 A1 | 4/2021 | Schillmoeller et al. | |
| 2021/0295849 A1 | 9/2021 | Van Der Ven et al. | |
| 2021/0358481 A1 | 11/2021 | D'Amato et al. | |
| 2022/0036882 A1 | 2/2022 | Ahn et al. | |
| 2022/0050585 A1 | 2/2022 | Fettes et al. | |
| 2022/0083136 A1 | 3/2022 | DeLeeuw | |
| 2022/0301561 A1 | 9/2022 | Robert Jose et al. | |

FOREIGN PATENT DOCUMENTS

| | | | |
|---|---|---|---|
| CN | 101427154 A | 5/2009 | |
| CN | 102999161 A | 3/2013 | |
| CN | 104572009 A | 4/2015 | |
| CN | 104885406 A | 9/2015 | |
| CN | 104885438 A | 9/2015 | |
| CN | 105162886 A | 12/2015 | |
| CN | 105284168 A | 1/2016 | |
| CN | 105389099 A | 3/2016 | |
| CN | 105427861 A | 3/2016 | |
| CN | 105453179 A | 3/2016 | |
| CN | 105472191 A | 4/2016 | |
| CN | 105493179 A | 4/2016 | |
| CN | 105632486 A | 6/2016 | |
| CN | 106030699 A | 10/2016 | |
| CN | 106796784 A | 5/2017 | |
| CN | 106910500 A | 6/2017 | |
| CN | 107122158 A | 9/2017 | |
| CN | 107465974 A | 12/2017 | |
| CN | 107644313 A | 1/2018 | |
| CN | 107767863 A | 3/2018 | |
| CN | 107832837 A | 3/2018 | |
| CN | 107919116 A | 4/2018 | |
| CN | 108028047 A | 5/2018 | |
| CN | 108028048 A | 5/2018 | |
| CN | 108198548 A | 6/2018 | |
| GB | 2501367 A | 10/2013 | |
| JP | 2004109361 A | 4/2004 | |
| JP | 2004163590 A | 6/2004 | |
| JP | 2007235875 A | 9/2007 | |
| JP | 2008217444 A | 9/2008 | |
| JP | 2014510481 A | 4/2014 | |
| JP | 2016009193 A | 1/2016 | |
| JP | 2019109510 A | 7/2019 | |
| TW | 201629950 A | 8/2016 | |
| WO | 2008096414 A1 | 8/2008 | |
| WO | 2015133022 A1 | 9/2015 | |
| WO | 2015195216 A1 | 12/2015 | |
| WO | 2016003509 A1 | 1/2016 | |
| WO | 2016136062 A1 | 9/2016 | |
| WO | 2018140777 A1 | 8/2018 | |
| WO | 2019005772 A1 | 1/2019 | |

OTHER PUBLICATIONS

Non-Final Office Action mailed on Jun. 8, 2023, issued in connection with U.S. Appl. No. 18/061,243, filed Dec. 2, 2022, 10 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.
Notice of Allowance mailed on Feb. 13, 2023, issued in connection with U.S. Appl. No. 18/045,360, filed Oct. 10, 2022, 9 pages.
Notice of Allowance mailed on Jul. 13, 2023, issued in connection with U.S. Appl. No. 18/145,501, filed Dec. 22, 2022, 9 pages.

(56) References Cited

OTHER PUBLICATIONS

Notice of Allowance mailed on Jun. 13, 2023, issued in connection with U.S. Appl. No. 17/249,776, filed Mar. 12, 2021, 10 pages.
Notice of Allowance mailed on Aug. 15, 2022, issued in connection with U.S. Appl. No. 17/101,949, filed Nov. 23, 2020, 11 pages.
Notice of Allowance mailed on Feb. 15, 2023, issued in connection with U.S. Appl. No. 17/659,613, filed Apr. 18, 2022, 21 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Sep. 15, 2022, issued in connection with U.S. Appl. No. 16/736,725, filed Jan. 1, 2020, 11 pages.
Notice of Allowance mailed on Aug. 17, 2022, issued in connection with U.S. Appl. No. 17/135,347, filed Dec. 28, 2020, 14 pages.
Notice of Allowance mailed on Nov. 17, 2022, issued in connection with U.S. Appl. No. 17/486,222, filed Sep. 27, 2021, 10 pages.
Notice of Allowance mailed on Jul. 18, 2022, issued in connection with U.S. Appl. No. 17/222,151, filed Apr. 5, 2021, 5 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2023, issued in connection with U.S. Appl. No. 17/562,412, filed Dec. 27, 2021, 9 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Sep. 21, 2022, issued in connection with U.S. Appl. No. 17/128,949, filed Dec. 21, 2020, 8 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Feb. 23, 2023, issued in connection with U.S. Appl. No. 17/532,674, filed Nov. 22, 2021, 10 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2022, issued in connection with U.S. Appl. No. 17/145,667, filed Jan. 11, 2021, 8 pages.
Notice of Allowance mailed on Oct. 26, 2022, issued in connection with U.S. Appl. No. 17/486,574, filed Sep. 27, 2021, 11 pages.
Notice of Allowance mailed on Jun. 27, 2022, issued in connection with U.S. Appl. No. 16/812,758, filed Mar. 9, 2020, 16 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2022, issued in connection with U.S. Appl. No. 17/327,911, filed May 24, 2021, 14 pages.
Notice of Allowance mailed on Jul. 29, 2022, issued in connection with U.S. Appl. No. 17/236,559, filed Apr. 21, 2021, 6 pages.
Notice of Allowance mailed on Mar. 29, 2023, issued in connection with U.S. Appl. No. 17/722,438, filed Apr. 18, 2022, 7 pages.
Japanese Patent Office, Office Action and Translation mailed on Nov. 15, 2022, issued in connection with Japanese Patent Application No. 2021-146144, 9 pages.
Japanese Patent Office, Office Action mailed on Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Office Action and Translation mailed on Feb. 27, 2023, issued in connection with Korean Application No. 10-2022-7021879, 5 pages.
Mathias Wolfel. Channel Selection by Class Separability Measures for Automatic Transcriptions on Distant Microphones, INTERSPEECH 2007 10.21437/Interspeech.2007-255, 4 pages.
Non-Final Office Action mailed on Feb. 2, 2023, issued in connection with U.S. Appl. No. 17/305,698, filed Jul. 13, 2021, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Apr. 12, 2023, issued in connection with U.S. Appl. No. 17/878,649, filed Aug. 1, 2022, 16 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2022, issued in connection with U.S. Appl. No. 17/446,690, filed Sep. 1, 2021, 10 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Jul. 18, 2023, issued in connection with U.S. Appl. No. 18/066,093, filed Dec. 14, 2022, 12 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 19, 2022, issued in connection with U.S. Appl. No. 17/385,542, filed Jul. 26, 2021, 9 pages.
Non-Final Office Action mailed on Apr. 20, 2023, issued in connection with U.S. Appl. No. 18/061,570, filed Dec. 5, 2022, 12 pages.
Non-Final Office Action mailed on Oct. 20, 2022, issued in connection with U.S. Appl. No. 17/532,674, filed Nov. 22, 2021, 52 pages.
Non-Final Office Action mailed on Dec. 22, 2022, issued in connection with U.S. Appl. No. 16/168,389, filed Oct. 23, 2018, 39 pages.
Non-Final Office Action mailed on Jun. 23, 2023, issued in connection with U.S. Appl. No. 18/048,945, filed Oct. 24, 2022, 10 pages.
Non-Final Office Action mailed on Sep. 23, 2022, issued in connection with U.S. Appl. No. 16/153,530, filed Oct. 5, 2018, 25 pages.

(56)          References Cited

OTHER PUBLICATIONS

Non-Final Office Action mailed on Apr. 24, 2023, issued in connection with U.S. Appl. No. 17/532,744, filed Nov. 22, 2021, 18 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on May 26, 2022, issued in connection with U.S. Appl. No. 16/989,805, filed Aug. 10, 2020, 14 pages.
Non-Final Office Action mailed on Feb. 27, 2023, issued in connection with U.S. Appl. No. 17/493,430, filed Oct. 4, 2021, 17 pages.
Non-Final Office Action mailed on Feb. 28, 2023, issued in connection with U.S. Appl. No. 17/548,921, filed Dec. 13, 2021, 12 pages.
Non-Final Office Action mailed on Jul. 3, 2023, issued in connection with U.S. Appl. No. 17/135,173, filed Dec. 28, 2020, 22 pages.
Non-Final Office Action mailed on Sep. 30, 2022, issued in connection with U.S. Appl. No. 17/353,254, filed Jun. 21, 2021, 22 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Feb. 7, 2023, issued in connection with U.S. Appl. No. 17/303,001, filed May 18, 2021, 8 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.
Non-Final Office Action mailed on Jun. 8, 2023, issued in connection with U.S. Appl. No. 18/048,034, filed Oct. 20, 2022, 8 pages.
Notice of Allowance mailed on Jun. 30, 2023, issued in connection with U.S. Appl. No. 17/303,001, filed May 18, 2021, 8 pages.
Notice of Allowance mailed on Mar. 30, 2023, issued in connection with U.S. Appl. No. 17/303,066, filed May 19, 2021, 7 pages.
Notice of Allowance mailed on Mar. 31, 2023, issued in connection with U.S. Appl. No. 17/303,735, filed Jun. 7, 2021, 19 pages.
Notice of Allowance mailed on Apr. 5, 2023, issued in connection with U.S. Appl. No. 17/549,253, filed Dec. 13, 2021, 10 pages.
Notice of Allowance mailed on Mar. 6, 2023, issued in connection with U.S. Appl. No. 17/449,926, filed Oct. 4, 2021, 8 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. INTERSPEECH, TALP Research Center, Jan. 2010, 5 pages.
Wölfel et al. Multi-source far-distance microphone selection and combination for automatic transcription of lectures, INTERSPEECH 2006—ICSLP, Jan. 2006, 5 pages.
Zhang et al. Noise Robust Speech Recognition Using Multi-Channel Based Channel Selection And Channel Weighting. The Institute of Electronics, Information and Communication Engineers, arXiv:1604.03276v1 [cs.SD] Jan. 1, 2010, 8 pages.
Advisory Action mailed on Nov. 7, 2022, issued in connection with U.S. Appl. No. 16/168,389, filed Oct. 23, 2018, 4 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 28, 2022, issued in connection with Australian Application No. 2018338812, 3 pages.
Canadian Patent Office, Canadian Examination Report mailed on Sep. 14, 2022, issued in connection with Canadian Application No. 3067776, 4 pages.
Canadian Patent Office, Canadian Examination Report mailed on Oct. 19, 2022, issued in connection with Canadian Application No. 3123601, 5 pages.
Canadian Patent Office, Canadian Examination Report mailed on Jun. 7, 2022, issued in connection with Canadian Application No. 3105494, 5 pages.
Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Dec. 30, 2022, issued in connection with Chinese Application No. 201880076775.3, 10 pages.
Chinese Patent Office, Second Office Action and Translation mailed on Apr. 1, 2023, issued in connection with Chinese Application No. 201980056604.9, 11 pages.
Chinese Patent Office, Second Office Action mailed on Dec. 21, 2022, issued in connection with Chinese Application No. 201980089721.5, 12 pages.

(56) References Cited

OTHER PUBLICATIONS

Chinese Patent Office, Second Office Action mailed on May 30, 2023, issued in connection with Chinese Application No. 201980070006. 7, 9 pages.

European Patent Office, Decision to Refuse European Patent Application mailed on May 30, 2022, issued in connection with European Application No. 17200837.7, 4 pages.

European Patent Office, European EPC Article 94.3 mailed on Jun. 5, 2023, issued in connection with European Application No. 20710649.3, 8 pages.

European Patent Office, European EPC Article 94.3 mailed on Feb. 10, 2023, issued in connection with European Application No. 19729968.8, 7 pages.

European Patent Office, European EPC Article 94.3 mailed on Jun. 21, 2022, issued in connection with European Application No. 19780508.8, 5 pages.

European Patent Office, European EPC Article 94.3 mailed on Feb. 23, 2023, issued in connection with European Application No. 19839734.1, 8 pages.

European Patent Office, European EPC Article 94.3 mailed on Nov. 28, 2022, issued in connection with European Application No. 18789515.6, 7 pages.

European Patent Office, European EPC Article 94.3 mailed on Jun. 30, 2022, issued in connection with European Application No. 19765953.5, 4 pages.

European Patent Office, European Extended Search Report mailed on Oct. 7, 2022, issued in connection with European Application No. 22182193.7, 8 pages.

European Patent Office, European Extended Search Report mailed on Jun. 23, 2022, issued in connection with European Application No. 22153180.9, 6 pages.

European Patent Office, European Extended Search Report mailed on Jun. 30, 2022, issued in connection with European Application No. 21212763.3, 9 pages.

European Patent Office, European Extended Search Report mailed on Jul. 8, 2022, issued in connection with European Application No. 22153523.0, 9 pages.

European Patent Office, European Search Report mailed on Oct. 4, 2022, issued in connection with European Application No. 22180226. 7, 6 pages.

European Patent Office, Summons to Attend Oral Proceedings mailed on Jul. 15, 2022, issued in connection with European Application No. 17792272.1, 11 pages.

Final Office Action mailed on Jun. 1, 2022, issued in connection with U.S. Appl. No. 16/806,747, filed Mar. 2, 2020, 20 pages.

Final Office Action mailed on Aug. 17, 2022, issued in connection with U.S. Appl. No. 16/179,779, filed Nov. 2, 2018, 26 pages.

Final Office Action mailed on May 17, 2023, issued in connection with U.S. Appl. No. 16/168,389, filed Oct. 23, 2018, 44 pages.

Final Office Action mailed on Aug. 22, 2022, issued in connection with U.S. Appl. No. 16/168,389, filed Oct. 23, 2018, 37 pages.

Final Office Action mailed on Jul. 27, 2022, issued in connection with U.S. Appl. No. 16/989,350, filed Aug. 10, 2020, 15 pages.

Final Office Action mailed on Mar. 29, 2023, issued in connection with U.S. Appl. No. 17/549,034, filed Dec. 13, 2021, 21 pages.

Final Office Action mailed on Jun. 7, 2022, issued in connection with U.S. Appl. No. 16/736,725, filed Jan. 7, 2020, 14 pages.

Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.

International Bureau, International Preliminary Report on Patentability, mailed on Jul. 21, 2022, issued in connection with International Application No. PCT/US2021/070007, filed on Jan. 6, 2021, 8 pages.

International Bureau, International Search Report and Written Opinion mailed on Mar. 20, 2023, issued in connection with International Application No. PCT/US2022/045399, filed on Sep. 30, 2022, 25 pages.

International Searching Authority, Invitation to Pay Additional Fees on Jan. 27, 2023, issued in connection with International Application No. PCT/US2022/045399, filed on Sep. 30, 2022, 19 pages.

Japanese Patent Office, Decision of Refusal and Translation mailed on Oct. 4, 2022, issued in connection with Japanese Patent Application No. 2021-535871, 6 pages.

Japanese Patent Office, Decision of Refusal and Translation mailed on May 23, 2023, issued in connection with Japanese Patent Application No. 2021-163622, 13 pages.

Japanese Patent Office, Decision of Refusal and Translation mailed on Jul. 26, 2022, issued in connection with Japanese Patent Application No. 2020-513852, 10 pages.

Japanese Patent Office, Non-Final Office Action mailed on Apr. 4, 2023, issued in connection with Japanese Patent Application No. 2021-573944, 5 pages.

Japanese Patent Office, Notice of Reasons for Refusal and Translation mailed on Sep. 13, 2022, issued in connection with Japanese Patent Application No. 2021-163622, 12 pages.

* cited by examiner

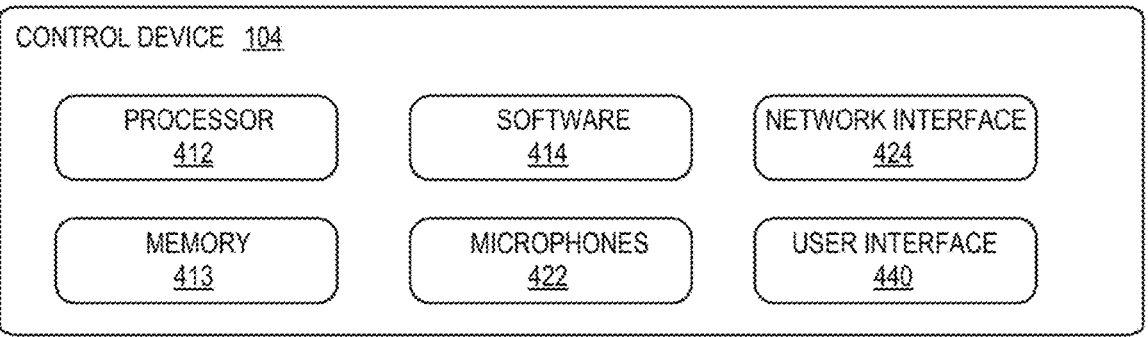

CONTROL DEVICE  104

PROCESSOR
412

SOFTWARE
414

NETWORK INTERFACE
424

MEMORY
413

MICROPHONES
422

USER INTERFACE
440

NOW PLAYING  (Office)

Track Title
Artist Name

}  544

QUEUE

Track 1
Track 2
Track 3
Track 4

}  546

Music Source 1    First VAS
Music Source 2    Second VAS
Music Source 3
+ ADD Music source    + ADD VAS source

}  548

}  542

Sonos    Browse    Rooms    Search music

No Music
Balcony     Group

Audio Component
*Living Room*
Living Room     Group

No Music
Dining Room
+ Kitchen     Group

No Music
Office     Group

543

Sonos    Browse    Rooms    Search music

| Command Keyword | Cognates | First Condition | Second Condition | Third Condition |
|---|---|---|---|---|
| "play" | "turn on" "resume" | playback queue includes media items | | |
| "pause" | "stop" "quiet" "mute" "off" | audio content being played back | | |
| "next" | "skip" "forward" | audio content being played back | playback queue is active | playback queue includes media item subsequent to the media item being played back |
| "previous" | "back" "last" | audio content being played back | playback queue is active | playback queue includes media item prior to the media item being played back |
| "repeat" | "restart" | audio content being played back | | |
| "shuffle" | "randomize" | playback queue is active | playback queue includes multiple media items | |

| Command Keyword | Cognates | First Condition | Second Condition | Third Condition |
|---|---|---|---|---|
| "group" (device1) (device2) ... (deviceN) | "join" "combine" | devices are present in the media playback system | devices not grouped | |
| "pair" (device1) (device2) ... (deviceN) | "bond" | devices are present in the media playback system | devices not paired | |
| "calibrate" | "trueplay" "tune" | audio content is not being played back | | |
| "turn on" (device) | "activate" | device is turned off | | |
| "volume" | "louder" "quieter" "turn it up/down" | audio content being played back | volume not at minimum/ maximum | |
| "mute" | "silence" "quiet" | audio content being played back | volume is not muted | |

| Favorites Playlist | First Voice Input ("<VAS Wake Word>, play me my favorites in the Office") | Second Voice Input ("play me my favorites in the Office") |
|---|---|---|
| first audio track | "Perfect Duet" by Ed Sheeran & Beyoncé Source: Beyoncé frequently played artist via voice input to the VAS | "Paul" by Big Thief Source: "Big Thief" Radio frequently-played Pandora station in the Office 101e |
| second audio track | "I Don't Care" by Ed Sheeran & Justin Bieber Source: Top 40 playlist most frequently played playlist via voice input to VAS | "Destroyer" by Lala Lala Source: Lala Lala frequently played artist on Spotify in the Office 101e |
| third audio track | "Go Your Own Way" by Fleetwood Mac Source: classic rock frequently played genre via voice input to the VAS | "Night Shift" by Lucy Dacus Source: "Night Shift" frequently played audio track on Apple Music in the Office 101e |
| fourth audio track | "No Problem" by Chance the Rapper feat. Lil Wayne & 2 Chainz Source: Chance the Rapper frequently played artist via voice input to the VAS | "Smoke Signals" by Phoebe Bridgers Source: Phoebe Bridgers designated as saved artist in Spotify |
| fifth audio track | "Talk" by Klalid Source: hip hop frequently played genre via voice input to the VAS | "Masterpiece" by Big Thief Source: "Big Thief" Radio most frequently-played Pandora station in the Office 101e |
| sixth audio track | "Never Really Over" by Katy Perry Source: Katy Perry frequently played artist via voice input to the VAS | "Head Alone" by Julia Jacklin Source: Julia Jacklin similar to other artists in playlist |

_Fig. 11_

1300

START

MONITOR INPUT SOUND-DATA STREAM FOR
(I) WAKE-WORD EVENT AND (II) FIRST COMMAND
KEYWORD EVENT

1302

DETECT WAKE-WORD EVENT

1304

STREAM SOUND DATA CORRESPONDING TO VOICE INPUT
TO ONE OR MORE REMOTE SERVERS OF VAS

1306

DETECT FIRST COMMAND KEYWORD EVENT

1308

DETERMINE INTENT BASED ON AT LEAST ONE KEYWORD

1310

PERFORM FIRST PLAYBACK COMMAND ACCORDING TO
DETERMINED INTENT

1312

END

1400

START

DETECT SOUND VIA ONE OR MORE MICROPHONES

1402

DETERMINE THAT (I) THE DETECTED SOUND INCLUDES A VOICE INPUT, (II) THE DETECTED SOUND EXCLUDES BACKGROUND SPEECH, AND (III) THE VOICE INPUT INCLUDES A COMMAND KEYWORD

1404

PERFORM PLAYBACK FUNCTION CORRESPONDING TO COMMAND KEYWORD

1406

END

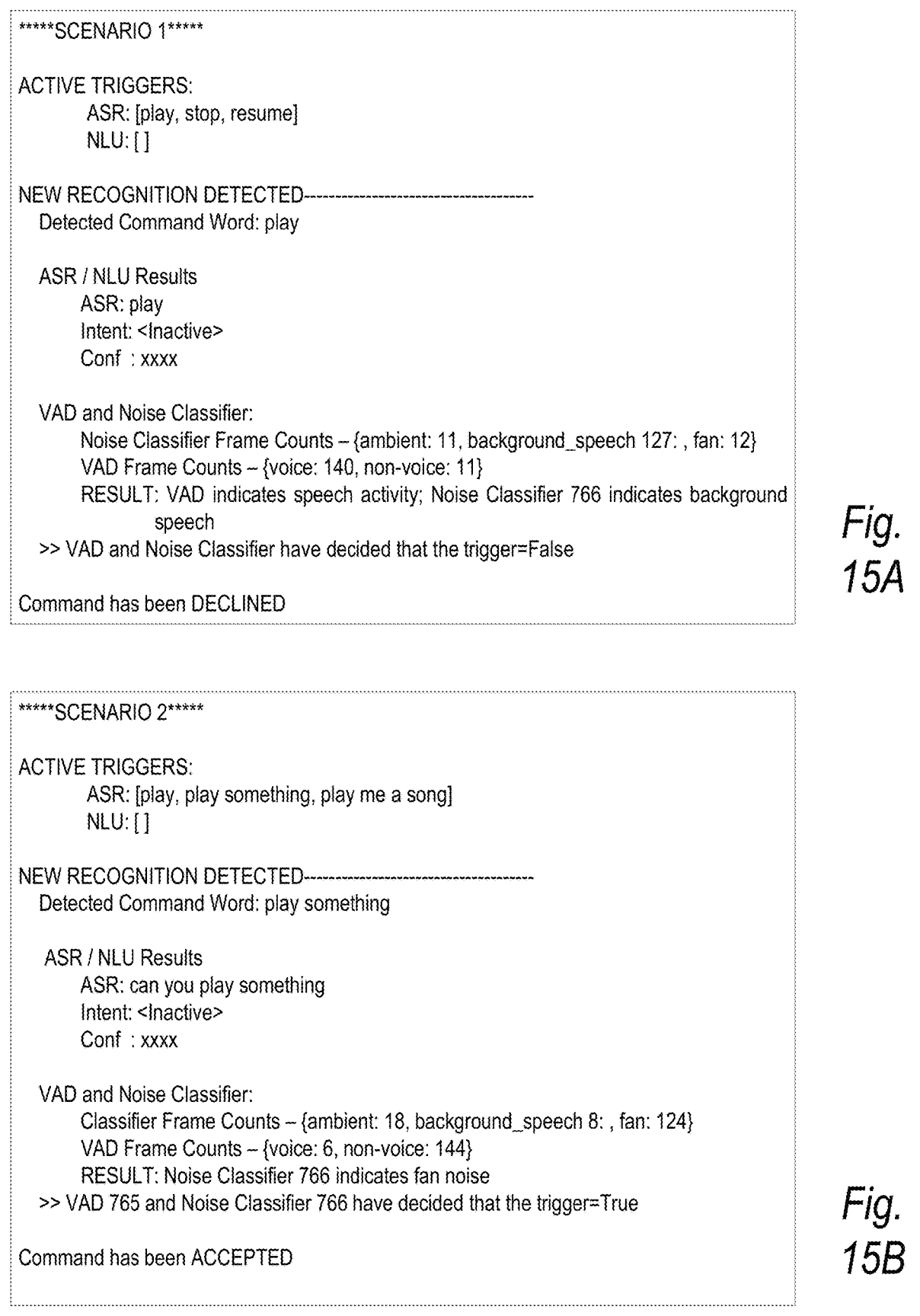

***SCENARIO 1***

ACTIVE TRIGGERS:
    ASR: [play, stop, resume]
    NLU: [ ]

NEW RECOGNITION DETECTED------------------------------------
  Detected Command Word: play ASR / NLU Results
    ASR: play
    Intent: <Inactive>
    Conf : xxxx VAD and Noise Classifier:
    Noise Classifier Frame Counts – {ambient: 11, background_speech 127: , fan: 12}
    VAD Frame Counts – {voice: 140, non-voice: 11}
    RESULT: VAD indicates speech activity; Noise Classifier 766 indicates background
        speech
  >> VAD and Noise Classifier have decided that the trigger=False Command has been DECLINED

*Fig. 15A*

***SCENARIO 2***

ACTIVE TRIGGERS:
    ASR: [play, play something, play me a song]
    NLU: [ ]

NEW RECOGNITION DETECTED------------------------------------
  Detected Command Word: play something ASR / NLU Results
    ASR: can you play something
    Intent: <Inactive>
    Conf : xxxx VAD and Noise Classifier:
    Classifier Frame Counts – {ambient: 18, background_speech 8: , fan: 124}
    VAD Frame Counts – {voice: 6, non-voice: 144}
    RESULT: Noise Classifier 766 indicates fan noise
  >> VAD 765 and Noise Classifier 766 have decided that the trigger=True Command has been ACCEPTED

*Fig. 15B*

```
*****SCENARIO 3*****

ACTIVE TRIGGERS:
        ASR: [play, stop, resume]
        NLU: [ ]

NEW RECOGNITION DETECTED------------------------------------
   Detected Command Word: play ASR / NLU Results
        ASR: play beet les in the kitchen
        Intent: playMusic
                              slot1: location=kitchen
                              slot2: content=The Beatles
        Conf : 0.63428231948273443

VAD and Noise Classifier:
        Noise Classifier Frame Counts – {ambient: 142, background_speech 8: , fan: 0}
        VAD Frame Counts – {voice: 112, non-voice: 38}
        RESULT: Noise Classifier 766 indicates ambient noise
   >> VAD and Noise Classifier have decided that the trigger=True Command has been ACCEPTED
```

*Fig. 15C*

```
*****SCENARIO 4*****

ACTIVE TRIGGERS:
        ASR: [ ]
        NLU: [playMusic, resumeMusic, speakerInterrupt]

NEW RECOGNITION DETECTED------------------------------------
   Detected Command Word: play something ASR / NLU Results
        ASR: lay some music in the office
        Intent: playMusic
                              slot: location=office
        Conf : 0.14620494842529297

VAD and Noise Classifier:
        Classifier Frame Counts – {ambient: 137, background_speech 13: , fan: 0}
        VAD Frame Counts – {voice: 139, non-voice: 11}
        RESULT: Noise Classifier 766 indicates ambient
   >> VAD 765 and Noise Classifier 766 have decided that the trigger=True Command has been ACCEPTED
```

*Fig. 15D*

NETWORK MICROPHONE DEVICE WITH COMMAND KEYWORD CONDITIONING

CROSS REFERENCE TO RELATED APPLICATIONS

This application claims priority under 35 U.S.C. § 120 to, and is a continuation of, U.S. non provisional patent application Ser. No. 16/812,758, filed on Mar. 9, 2020, entitled "Network Microphone Device With Command Keyword Conditioning," and issued as U.S. Pat. No. 11,501,773 on Nov. 15, 2022, which is incorporated herein by reference in its entirety U.S. non provisional patent application Ser. No. 16/812, 758 claims priority under 35 U.S.C. § 120 to, and is a continuation of, U.S. non-provisional patent application Ser. No. 16/439,009, filed on Jun. 12, 2019, entitled "Network Microphone Device With Command Keyword Conditioning," and issued as U.S. Pat. No. 10,586,540 on Mar. 10, 2020, which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 4 is a functional block diagram of an example controller device in accordance with aspects of the disclosure.

FIGS. 5A and 5B are controller interfaces in accordance with aspects of the disclosure.

FIG. 9A shows a first portion of a table illustrating example command keywords and associated conditions in accordance with aspects of the disclosure;

FIG. 9B shows a second portion of a table illustrating example command keywords and associated conditions in accordance with aspects of the disclosure;

FIG. 11 shows a table illustrating example playlists in accordance with aspects of the disclosure;

FIGS. 15A, 15B, 15C, and 15D show exemplary output of an example NMD configured in accordance with aspects of the disclosure.

Figure 1A:
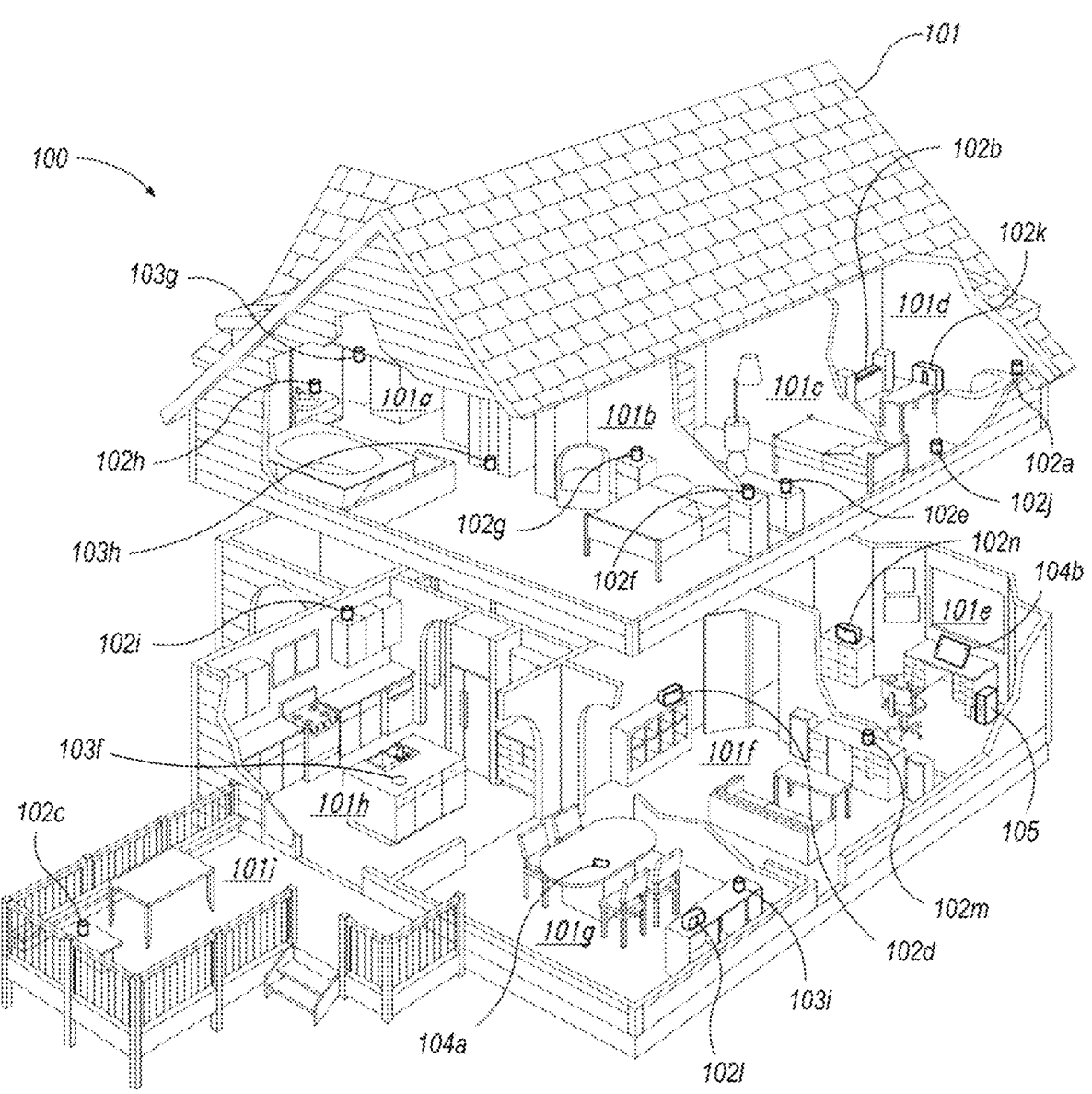
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Example techniques described herein involve wake-word engines configured to detect commands. An example network microphone device ("NMD") may implement such a wake-word engine in parallel with a wake-word engine that invokes a voice assistant service ("VAS"). While a VAS wake-word engine may be involved with nonce wake-words, a command keyword engine is invoked with commands, such as "play" or "skip."

Network microphone devices may be used facilitate voice control of smart home devices, such as wireless audio playback devices, illumination devices, appliances, and home-automation devices (e.g., thermostats, door locks, etc.). An NMD is a networked computing device that typically includes an arrangement of microphones, such as a microphone array, that is configured to detect sound present in the NMD's environment. In some examples, an NMD may be implemented within another device, such as an audio playback device.

A voice input to such an NMD will typically include a wake word followed by an utterance comprising a user request. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, "Hey, Siri" to invoke the APPLE® VAS, or "Hey, Sonos" to invoke a VAS offered by SONOS®, among other examples. In practice, a wake word may also be referred to as, for example, an activation-, trigger-, wakeup-word or -phrase, and may take the form of any suitable word, combination of words (e.g., a particular phrase), and/or some other audio cue.

To identify whether sound detected by the NMD contains a voice input that includes a particular wake word, NMDs often utilize a wake-word engine, which is typically onboard the NMD. The wake-word engine may be configured to identify (i.e., "spot" or "detect") a particular wake word in recorded audio using one or more identification algorithms. Such identification algorithms may include pattern recognition trained to detect the frequency and/or time domain patterns that speaking the wake word creates. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present in the recorded audio.

When a wake-word engine detects a wake word in recorded audio, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. With a VAS wake-word engine, these additional processes may include extracting detected-sound data from a buffer, among other possible additional processes, such as outputting an alert (e.g., an audible chime and/or a light indicator) indicating that a wake word has been identified. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices.

When a VAS receives detected-sound data, the VAS processes this data, which involves identifying the voice input and determining intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

One challenge with traditional wake-word engines is that they can be prone to false positives caused by "false wake word" triggers. A false positive in the NMD context generally refers to detected sound input that erroneously invokes a VAS. With a VAS wake-work engine, a false positive may invoke the VAS, even though there is no user actually intending to speak a wake word to the NMD.

For example, a false positive can occur when a wake-word engine identifies a wake word in detected sound from audio (e.g., music, a podcast, etc.) playing in the environment of the NMD. This output audio may be playing from a playback device in the vicinity of the NMD or by the NMD itself. For instance, when the audio of a commercial advertising AMAZON's ALEXA service is output in the vicinity of the NMD, the word "Alexa" in the commercial may trigger a false positive. A word or phrase in output audio that causes a false positive may be referred to herein as a "false wake word."

In other examples, words that are phonetically similar to an actual wake word cause false positives. For example, when the audio of a commercial advertising LEXUS® automobiles is output in the vicinity of the NMD, the word "Lexus" may be a false wake word that causes a false positive because this word is phonetically similar to "Alexa." As other examples, false positives may occur when a person speaks a VAS wake word or phonetically similar word in conversation.

The occurrences of false positives are undesirable, as they may cause the NMD to consume additional resources or interrupt audio playback, among other possible negative consequences. Some NMDs may avoid false positives by requiring a button press to invoke the VAS, such as on the AMAZON FIRETV remote or the APPLE TV remote. In practice, the impact of a false positive generated by a VAS wake-word engine is often partially mitigated by the VAS processing the detected-sound data and determining that the detected-sound data does not include a recognizable voice input.

In contrast to a pre-determined nonce wake word that invokes a VAS, a keyword that invokes a command (referred to herein as a "command keyword") may be a word or a combination of words (e.g., a phrase) that functions as a command itself, such as a playback command. In some implementations, a command keyword may function as both a wake word and the command itself. That is, when a command keyword engine detects a command keyword in recorded audio, the NMD may determine that a command keyword event has occurred and responsively performs a command corresponding to the detected keyword. For instance, based on detecting the command keyword "pause," the NMD causes playback to be paused. One advantage of a command keyword engine is that the recorded audio does not necessarily need to be sent to a VAS for processing, which may result in a quicker response to the voice input as well as increased user privacy, among other possible benefits. In some implementations described below, a detected command keyword event may cause one or more subsequent actions, such as local natural language processing of a voice input. In some implementations, a command keyword event may be one condition among one or more other conditions that must be detected before causing such actions.

According to example techniques described herein, after detecting a command keyword, example NMDs may generate a command keyword event (and perform a command corresponding to the detected command keyword) only when certain conditions corresponding to the detected command keyword are met. For instance, after detecting the command keyword "skip," an example NMD generates a command keyword event (and skips to the next track) only when certain playback conditions indicating that a skip should be performed are met. These playback conditions may include, for example, (i) a first condition that a media item is being played back, (ii) a second condition that a queue is active, and (iii) a third condition that the queue includes a media item subsequent to the media item being played back. If any of these conditions are not satisfied, the command keyword event is not generated (and no skip is performed).

By requiring both (a) detection of a command keyword and (b) certain conditions corresponding to the detected command keyword before generating a command keyword event, the prevalence of false positives may be reduced. For instance, when playing TV audio, dialogue or other TV audio would not have the potential to generate false positives for the "skip" command keyword since the TV audio input is active (and not a queue). Moreover, the NMD can continually listen for command keywords (rather than requiring a button press to put the NMD in condition to receive a voice input) as the conditions relating to the state of the controlled device gate wake word event generation.

Aspects of conditioning keyword events may also be applicable to VAS wake-word engines and other traditional nonce wake-word engines. For example, such conditioning can possibly make practicable other wake word engines in addition to command keyword engines that might otherwise be prone to false positives. For instance, an NMD may include a streaming audio service wake word engine that supports certain wake words unique to the streaming audio service. For instance, after detecting a streaming audio service wake word, an example NMD generates a streaming audio service wake word event only when certain streaming audio service are met. These playback conditions may include, for example, (i) an active subscription to the streaming audio service and (ii) audio tracks from the streaming audio service in a queue, among other examples.

Further, a command keyword may be a single word or a phrase. Phrases generally include more syllables, which generally make the command keyword more unique and easier to identify by the command keyword engine. Accordingly, in some cases, command keywords that are phrases may be less prone to false positive detections. Further, using a phrase may allow more intent to be incorporated into the command keyword. For instance, a command keyword of "skip forward" signals that a skip should be forward in a queue to a subsequent track, rather than backward to a previous track.

Yet further, an NMD may include a local natural language unit (NLU). In contrast to a NLU implemented in one or more cloud servers that is capable of recognizing a wide variety of voice inputs, example local NLUs are capable of recognizing a relatively small library of keywords (e.g., 10,000 words and phrases), which facilitates practical implementation on the NMD. When the command keyword engine generates a command keyword event after detecting a command keyword in a voice input, the local NLU may process a voice utterance portion of the voice input to look for keywords from the library and determine an intent from the found keywords.

If the voice utterance portion of the voice input includes at least one keyword from the library, the NMD may perform the command corresponding to the command keyword according to one or more parameters corresponding to the least one keyword. In other words, the keywords may alter or customize the command corresponding to the command keyword. For instance, the command keyword engine may be configured to detect "play" as a command keyword and the local NLU library could include the phrase "low volume." Then, if the user speaks "Play music at low volume" as a voice input, the command keyword engine generates a command keyword event for "play" and uses the keyword "low volume" as a parameter for the "play" command. Accordingly, the NMD not only causes playback based on this voice input, but also lowers the volume.

Example techniques involve customizing the keywords in the library to users of the media playback system. For instance, the NMD may populate the library using names (e.g., zone names, smart device names, and user names) that have been configured in the media playback system. Yet further, the NMD may populate the local NLU library with names of favorite playlists, Internet radio stations, and the like. Such customization allows the local NLU to more efficiently assist the user with voice commands. Such customization may also be advantageous because the size of the local NLU library can be limited.

One possible advantage of a local NLU is increased privacy. By processing voice utterances locally, a user may avoid transmitting voice recordings to the cloud (e.g., to servers of a voice assistant service). Further, in some implementations, the NMD may use a local area network to discover playback devices and/or smart devices connected to the network, which may avoid providing this data to the cloud. Also, the user's preferences and customizations may remain local to the NMD(s) in the household, perhaps only using the cloud as an optional backup. Other advantages are possible as well.

As noted above, example techniques related to command keywords. A first example implementation involves a device including a network interface, one or more processors, at least one microphone configured to detect sound, at least one speaker, a wake-word engine configured to receive input sound data representing the sound detected by the at least one microphone and generate a voice assistant service (VAS) wake word event when the wake-word engine detects a VAS wake word in the input sound data, wherein the device streams sound data representing the sound detected by the at least one microphone to one or more servers of the voice assistant service when the VAS wake word event is generated, and a command keyword engine configured to receive input sound data representing the sound detected by the at least one microphone and generate a command keyword event when (a) the second wake-word engine detects, in the input sound data, one of a plurality of command keywords supported by the second wake-word engine and (b) one or more playback conditions corresponding to the detected command keyword are satisfied, wherein each command keyword of the plurality of command keywords is a respective playback command. The device detects, via the command keyword engine, a first command keyword, and determines whether one or more playback conditions corresponding to the first command keyword are satisfied. Based on (a) detecting the first command keyword and (b) determining that the one or more playback conditions corresponding to the first command keyword are satisfied, the device generates, via the command keyword engine, a command keyword event corresponding to the first command keyword. In response to the command keyword event and determining that the one or more playback conditions are satisfied, the device performs a first playback command corresponding to the first command keyword.

A second example implementation involves a device including a network interface, one or more processors, at least one microphone configured to detect sound, at least one speaker, a wake-word engine configured to receive input sound data representing the sound detected by the at least one microphone and generate a voice assistant service (VAS) wake word event when the wake-word engine detects a VAS wake word in the input sound data, wherein the device streams sound data representing the sound detected by the at least one microphone to one or more servers of the voice assistant service when the VAS wake word event is generated, a command keyword engine configured to receive input sound data representing the sound detected by the at least one microphone. The device detects, via the command keyword engine, a first command keyword that is one a plurality of command keywords supported by the device, and determines, via a local natural language unit (NLU), an intent based on the least one keyword. After detecting the first command keyword event and determining the intent, the device performs a first playback command corresponding to the first command keyword according to the determined intent.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
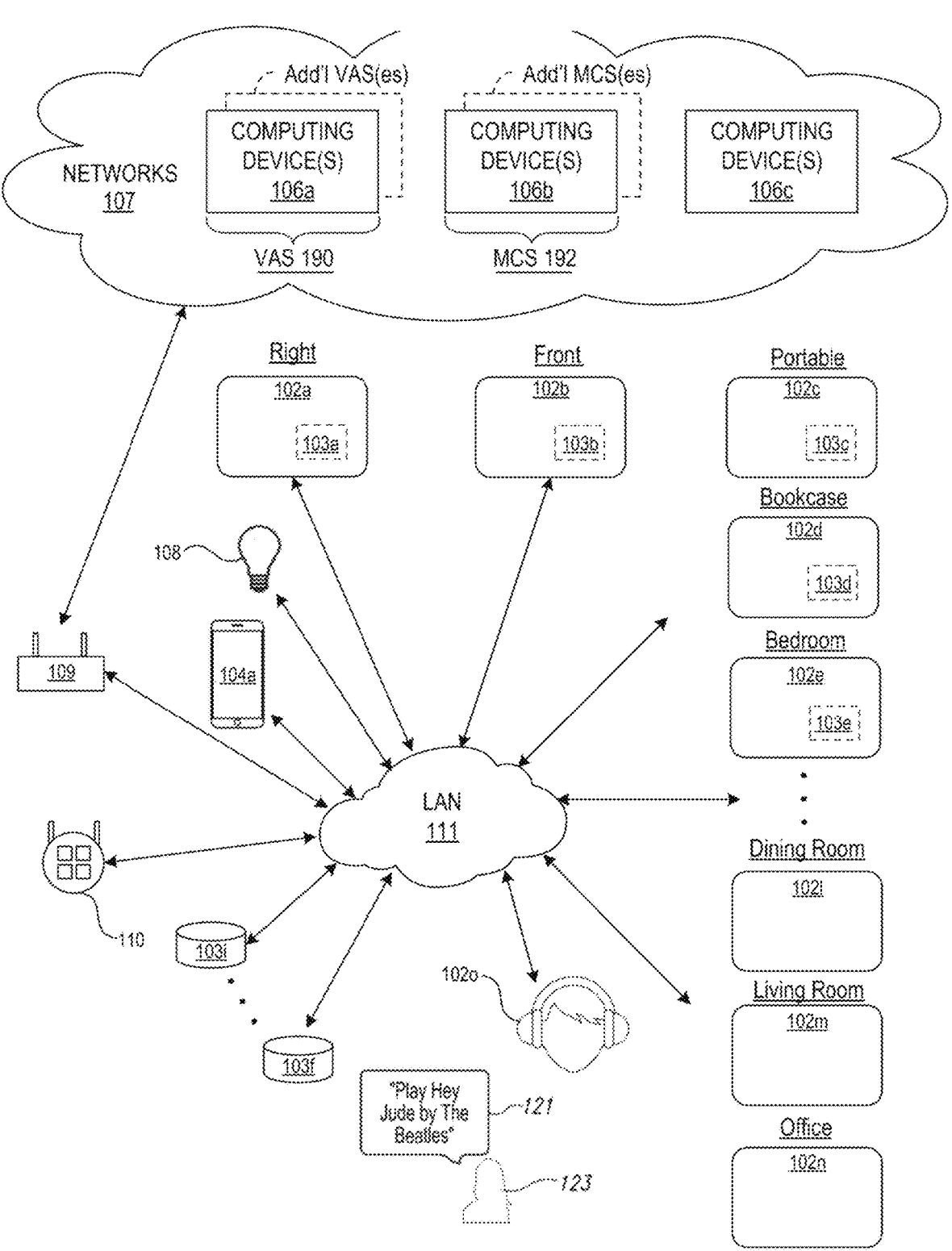
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b*, (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a—e include or are otherwise equipped with corresponding NMDs 103a—e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the name "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
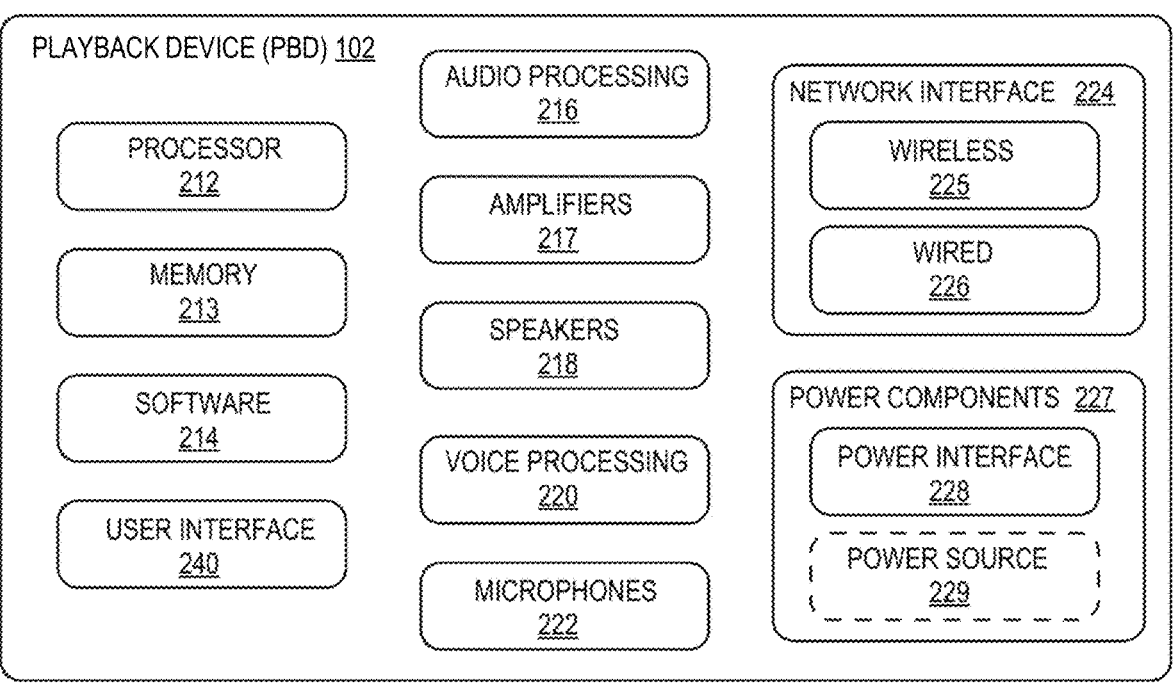
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
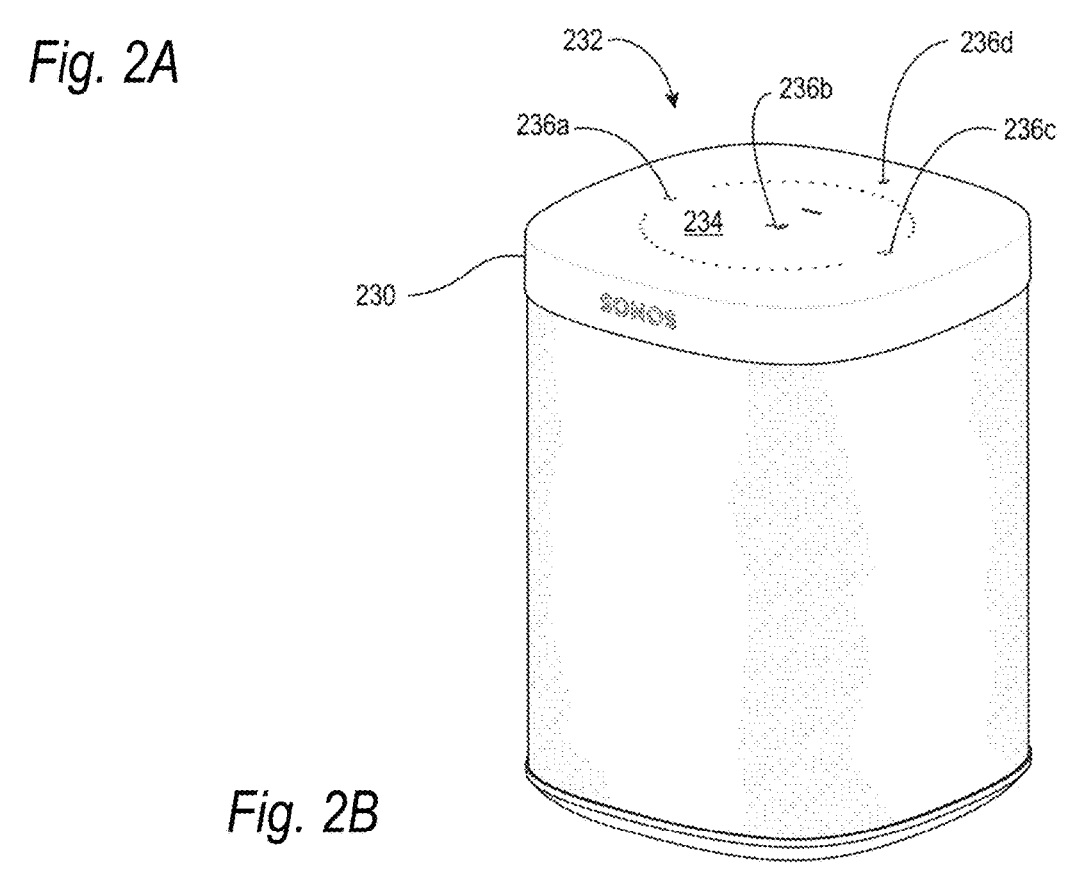
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CON-NECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
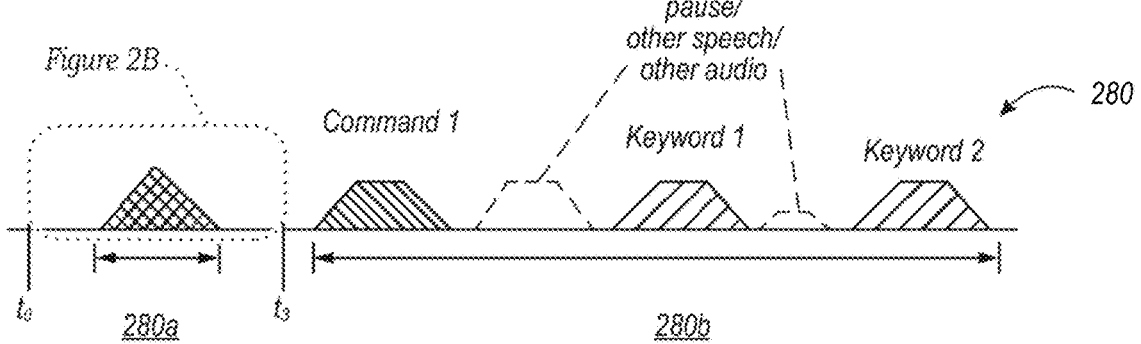
FIG. 2C is a diagram of an example voice input.

FIG. 2C is a diagram of an example voice input 280 that may be processed by an NMD or an NMD-equipped play-back device. The voice input 280 may include a keyword portion 280a and an utterance portion 280b. The keyword portion 280a may include a wake word or a command keyword. In the case of a wake word, the keyword portion 280a corresponds to detected sound that caused a wake-word The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. In certain implementations, an underlying intent can also be based or at least partially based on certain words in the keyword portion 280a, such as when keyword portion includes a command keyword. In any case, the words may correspond to one or more commands, as well as a certain command and certain keywords. A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoke by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
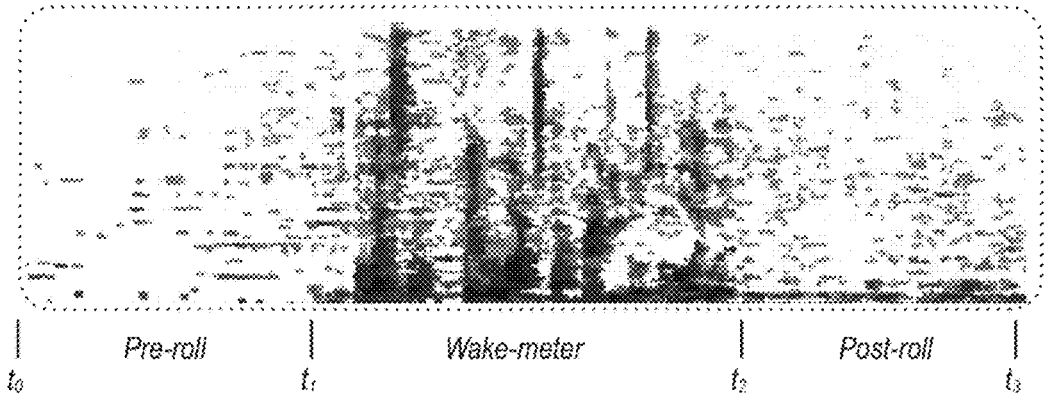
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280a of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for command keyword detection may be tuned to accommodate a wide range of keywords (e.g., 5, 10, 100, 1,000, 10,000 keywords). Command keyword detection, in contrast to wake-word detection, may involve feeding ASR output to an onboard, local NLU which together with the ASR determine when command word events have occurred. In some implementations described below, the local NLU may determine an intent based on one or more other key-words in the ASR output produced by a particular voice input. In these or other implementations, a playback device may act on a detected command keyword event only when the playback devices determines that certain conditions have been met, such as environmental conditions (e.g., low back-ground noise).

b. Example Playback Device Configurations

Figures 3A, 3B, 3C, 3D, 3E:
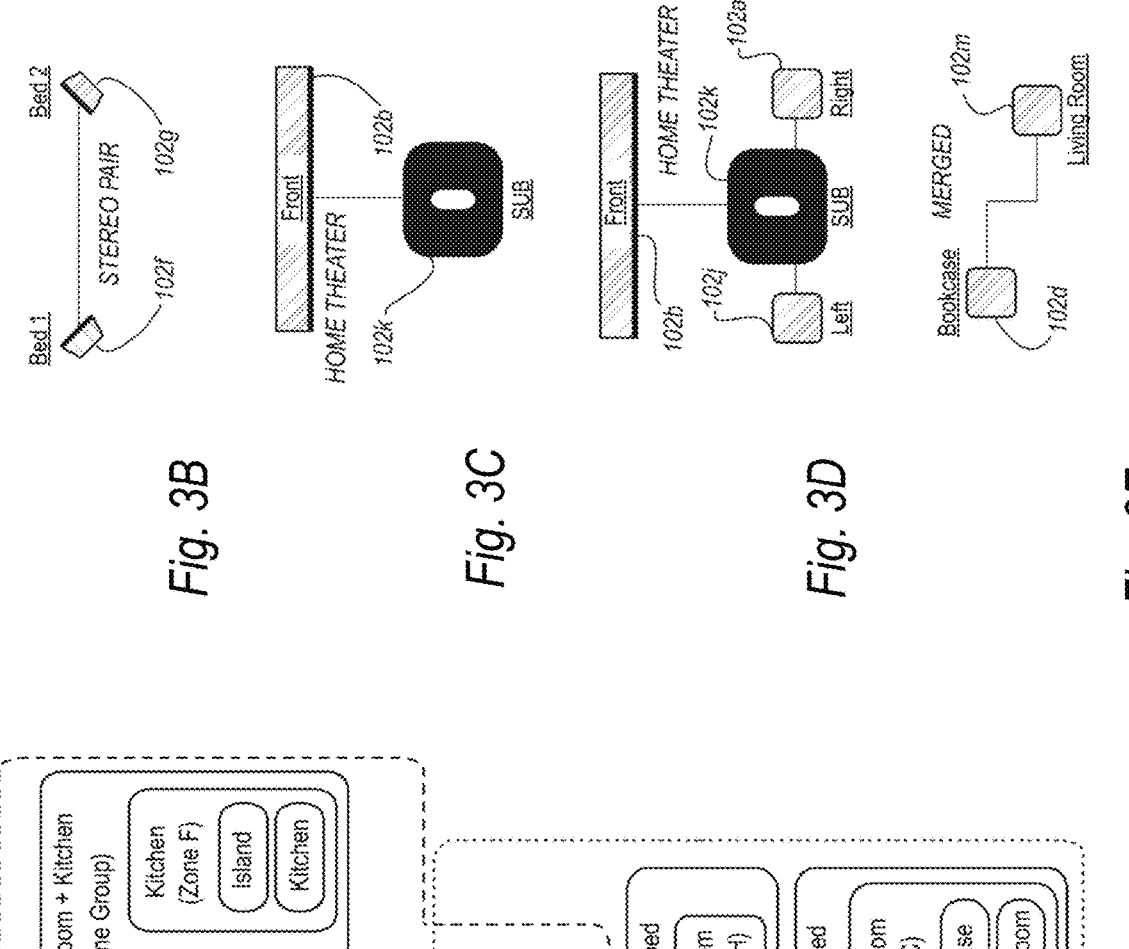
FIGS. 3A, 3B, 3C, 3D and 3E are diagrams showing example playback device configurations in accordance with aspects of the disclosure.

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540a and 540b shown in FIGS. 5A and 5B. Referring to FIGS. 5A and 5B together, the controller interfaces 540a and 540b includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a repre- sented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical represen- tations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a net- work-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network acces- sible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
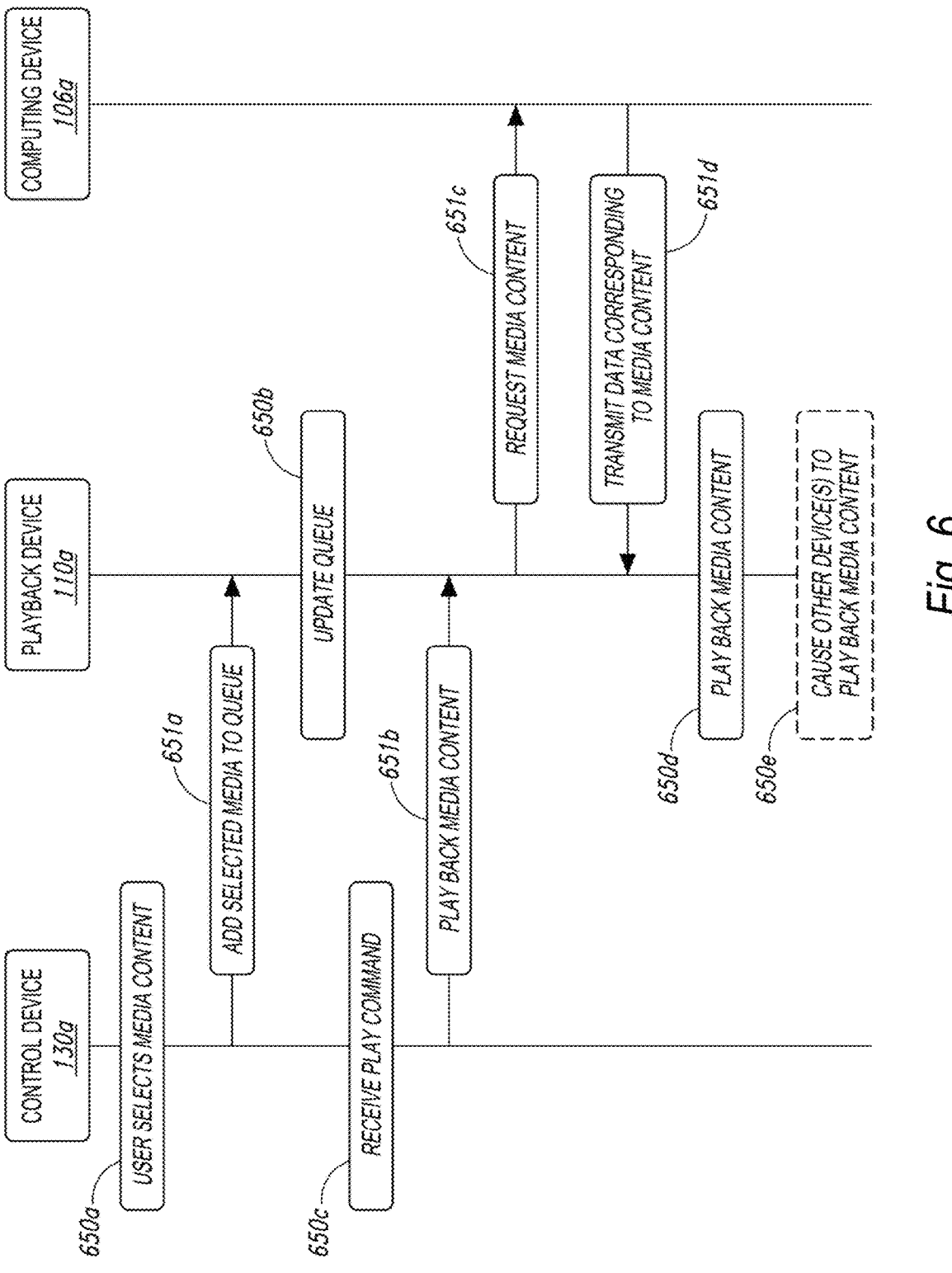
FIG. 6 is a message flow diagram of a media playback system.

FIG. 6 is a message flow diagram illustrating data exchanges between devices of the MPS 100. At step 650a, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651a to the playback device 102 (FIGS. 1A-1C) to add the selected media content to a playback queue on the playback device 102.

At step 650b, the playback device 102 receives the message 651a and adds the selected media content to the playback queue for play back.

At step 650c, the control device 104 receives input corresponding to a command to play back the selected media content. In response to receiving the input corresponding to the command to play back the selected media content, the control device 104 transmits a message 651b to the playback device 102 causing the playback device 102 to play back the selected media content. In response to receiving the message 651b, the playback device 102 transmits a message 651c to the computing device 106 requesting the selected media content. The computing device 106, in response to receiving the message 651c, transmits a message 651d comprising data (e.g., audio data, video data, a URL, a URI) corre- sponding to the requested media content.

At step 650d, the playback device 102 receives the message 651d with the data corresponding to the requested media content and plays back the associated media content.

At step 650e, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the play- back device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Example Command Keyword Eventing

Figure 7A:
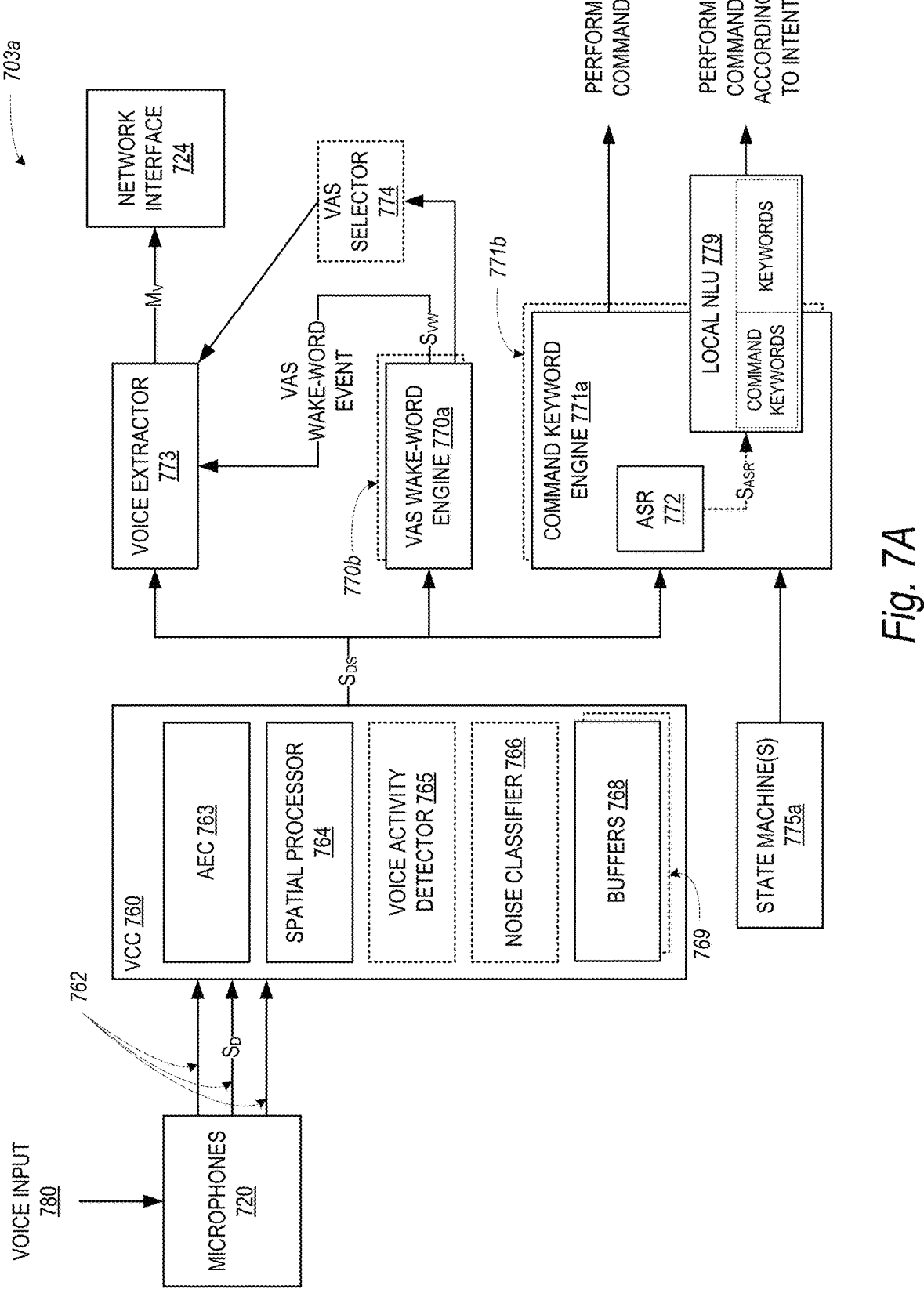
FIG. 7A is a functional block diagram of certain components of a first example network microphone device in accordance with aspects of the disclosure.
Figure 7B:
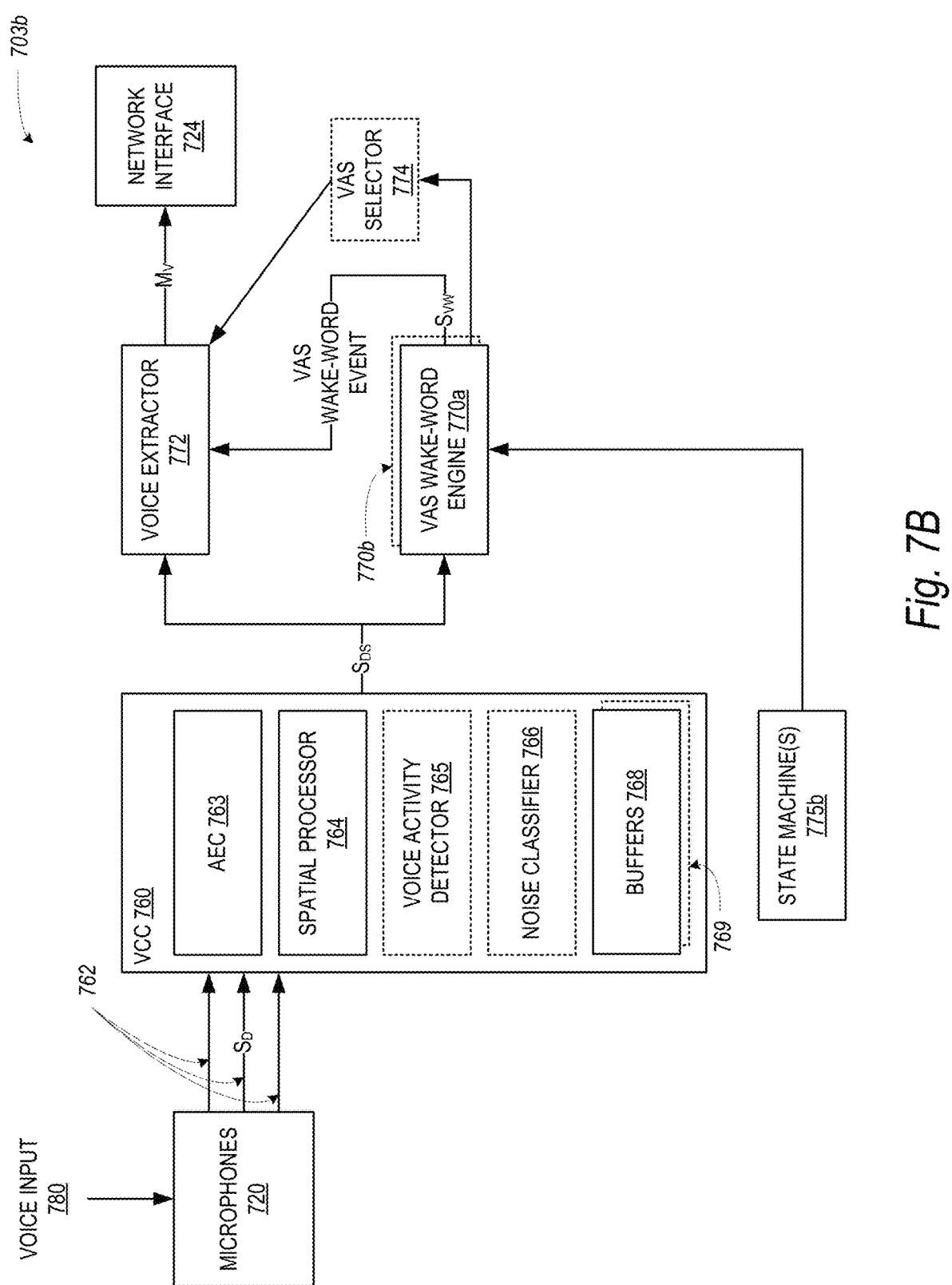
FIG. 7B is a functional block diagram of certain components of a second example network microphone device in accordance with aspects of the disclosure.

FIGS. 7A and 7B are functional block diagrams showing aspects of an NMD 703a and an NMD 703 configured in accordance with embodiments of the disclosure. The NMD 703a and NMD 703b are referred to collectively as the NMD 703. The NMD 703 may be generally similar to the NMD 103 and include similar components. As described in more detail below, the NMD 703a (FIG. 7A) is configured to handle certain voice inputs locally, without necessarily transmitting data representing the voice input to a voice assistant service. However, the NMD 703a is also configured to process other voice inputs using a voice assistant service. The NMD 703b (FIG. 7B) is configured to process voice inputs using a voice assistant service and may have limited or no local NLU or command keyword detection.

Referring to the FIG. 7A, the NMD 703 includes voice capture components ("VCC") 760, a VAS wake-word engine 770a, and a voice extractor 773. The VAS wake-word engine 770a and the voice extractor 773 are operably coupled to the VCC 760. The NMD 703a further a command keyword engine 771a operably coupled to the VCC 760.

The NMD 703 further includes microphones 720 and the at least one network interface 720 as described above and may also include other components, such as audio amplifiers, a user interface, etc., which are not shown in FIG. 7A for purposes of clarity. The microphones 720 of the NMD 703a are configured to provide detected sound, $S_D$, from the environment of the NMD 703 to the VCC 760. The detected sound $S_D$ may take the form of one or more analog or digital signals. In example implementations, the detected sound $S_D$ may be composed of a plurality signals associated with respective channels 762 that are fed to the VCC 760.

Each channel 762 may correspond to a particular microphone 720. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 7A, the VCC 760 includes an AEC 763, a spatial processor 764, and one or more buffers 768. In operation, the AEC 763 receives the detected sound $S_D$ and filters or otherwise processes the sound to suppress echoes and/or to otherwise improve the quality of the detected sound $S_D$. That processed sound may then be passed to the spatial processor 764.

The spatial processor 764 is typically configured to analyze the detected sound $S_D$ and identify certain characteristics, such as a sound's amplitude (e.g., decibel level), frequency spectrum, directionality, etc. In one respect, the spatial processor 764 may help filter or suppress ambient noise in the detected sound $S_D$ from potential user speech based on similarities and differences in the constituent channels 762 of the detected sound $S_D$, as discussed above. As one possibility, the spatial processor 764 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 764 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 768—one or more of which may be part of or separate from the memory 213 (FIG. 2A)— capture data corresponding to the detected sound $S_D$. More specifically, the one or more buffers 768 capture detected-sound data that was processed by the upstream AEC 764 and spatial processor 766.

The network interface 724 may then provide this information to a remote server that may be associated with the MPS 100. In one aspect, the information stored in the additional buffer 769 does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this information to adapt and fine-tune voice processing algorithms, including sensitivity tuning as discussed below. In some implementations the additional buffer may comprise or include functionality similar to lookback buffers disclosed, for example, in U.S. patent application Ser. No. 15/989,715, filed May 25, 2018, titled "Determining and Adapting to Changes in Microphone Performance of Playback Devices"; U.S. patent application Ser. No. 16/141,875, filed Sep. 25, 2018, titled "Voice Detection Optimization Based on Selected Voice Assistant Service"; and U.S. patent application Ser. No. 16/138,111, filed Sep. 21, 2018, titled "Voice Detection Optimization Using Sound Metadata," which are incorporated herein by reference in their entireties.

In any event, the detected-sound data forms a digital representation (i.e., sound-data stream), $S_{DS}$, of the sound detected by the microphones 720. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 768 for further processing by downstream components, such as the VAS wake-word engines 770 and the voice extractor 773 of the NMD 703.

In some implementations, at least one buffer 768 captures detected-sound data utilizing a sliding window approach in which a given amount (i.e., a given window) of the most recently captured detected-sound data is retained in the at least one buffer 768 while older detected-sound data is overwritten when it falls outside of the window. For example, at least one buffer 768 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 703 may process the sound-data stream $S_{DS}$. For instance, the VAS wake-word engines 770 are configured to apply one or more identification algorithms to the sound-data stream $S_{DS}$ (e.g., streamed sound frames) to spot potential wake words in the detected-sound $S_D$. This process may be referred to as automatic speech recognition. The VAS wake-word engine 770a and command keyword engine 771a apply different identification algorithms corresponding to their respective wake words, and further generate different events based on detecting a wake word in the detected-sound $S_D$.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wakewords.

For instance, when the VAS wake-word engine 770a detects a potential VAS wake word, the VAS work-word engine 770a provides an indication of a "VAS wake-word event" (also referred to as a "VAS wake-word trigger"). In the illustrated example of FIG. 7A, the VAS wake-word engine 770a outputs a signal, $S_{VW}$, that indicates the occurrence of a VAS wake-word event to the voice extractor 773.

In multi-VAS implementations, the NMD 703 may include a VAS selector 774 (shown in dashed lines) that is generally configured to direct extraction by the voice extractor 773 and transmission of the sound-data stream $S_{DS}$ to the appropriate VAS when a given wake-word is identified by a particular wake-word engine (and a corresponding wakeword trigger), such as the VAS wake-word engine 770a and at least one additional VAS wake-word engine 770b (shown in dashed lines). In such implementations, the NMD 703 may include multiple, different VAS wake-word engines and/or voice extractors, each supported by a respective VAS.

Similar to the discussion above, each VAS wake-word engine 770 may be configured to receive as input the sound-data stream $S_{DS}$ from the one or more buffers 768 and apply identification algorithms to cause a wake-word trigger for the appropriate VAS. Thus, as one example, the VAS wake-word engine 770a may be configured to identify the wake word "Alexa" and cause the NMD 703a to invoke the AMAZON VAS when "Alexa" is spotted. As another example, the wake-word engine 770b may be configured to identify the wake word "Ok, Google" and cause the NMD 520 to invoke the GOOGLE VAS when "Ok, Google" is spotted. In single-VAS implementations, the VAS selector 774 may be omitted.

In response to the VAS wake-word event (e.g., in response to the signal $S_{VW}$ indicating the wake-word event), the voice extractor 773 is configured to receive and format (e.g., packetize) the sound-data stream Sm. For instance, the voice extractor 773 packetizes the frames of the sound-data stream $S_{DS}$ into messages. The voice extractor 773 transmits or streams these messages, $M_V$, that may contain voice input in real time or near real time to a remote VAS via the network interface 724.

The VAS is configured to process the sound-data stream $S_{DS}$ contained in the messages $M_V$ sent from the NMD 703. More specifically, the NMD 703a is configured to identify a voice input 780 based on the sound-data stream $S_{DS}$. As described in connection with FIG. 2C, the voice input 780 may include a keyword portion and an utterance portion. The keyword portion corresponds to detected sound that caused a wake-word event, or leads to a command-keyword event when one or more certain conditions, such as certain playback conditions, are met. For instance, when the voice input 780 includes a VAS wake word, the keyword portion corresponds to detected sound that caused the wake-word engine 770a to output the wake-word event signal $S_{VW}$ to the voice extractor 773. The utterance portion in this case corresponds to detected sound that potentially comprises a user request following the keyword portion.

When a VAS wake-word event occurs, the VAS may first process the keyword portion within the sound-data stream $S_{DS}$ to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 703a with an instruction for the NMD 703a to cease extraction of sound data, which causes the voice extractor 773 to cease further streaming of the detected-sound data to the VAS. The VAS wake-word engine 770a may resume or continue monitoring sound specimens until it spots another potential VAS wake word, leading to another VAS wakeword event. In some implementations, the VAS does not process or receive the keyword portion but instead processes only the utterance portion.

In any case, the VAS processes the utterance portion to identify the presence of any words in the detected-sound data and to determine an underlying intent from these words. The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information, such as detected pauses (e.g., periods of non-speech) between words spoken by a user, as shown in FIG. 2C. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these playback devices 102 (e.g., raise/lower volume, group/ungroup devices, etc.), or turn on/off certain smart devices, among other actions. After receiving the response from the VAS, the wake-word engine 770a of the NMD 703 may resume or continue to monitor the sound-data stream $S_{DS1}$ until it spots another potential wake-word, as discussed above.

In general, the one or more identification algorithms that a particular VAS wake-word engine, such as the VAS wake-word engine 770a, applies are configured to analyze certain characteristics of the detected sound stream $S_{DS}$ and compare those characteristics to corresponding characteristics of the particular VAS wake-word engine's one or more particular VAS wake words. For example, the wake-word engine 770a may apply one or more identification algorithms to spot spectral characteristics in the detected sound stream $S_{DS}$ that match the spectral characteristics of the engine's one or more wake words, and thereby determine that the detected sound $S_D$ comprises a voice input including a particular VAS wake word.

In some implementations, the one or more identification algorithms may be third-party identification algorithms (i.e., developed by a company other than the company that provides the NMD 703a). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

As noted above, the NMD 703a also includes a command keyword engine 771a in parallel with the VAS wake-word engine 770a. Like the VAS wake-word engine 770a, the command keyword engine 771a may apply one or more identification algorithms corresponding to one or more wake words. A "command keyword event" is generated when a particular command keyword is identified in the detected-sound $S_D$. In contrast to the nonce words typically as utilized as VAS wake words, command keywords function as both the activation word and the command itself. For instance, example command keywords may correspond to playback commands (e.g., "play," "pause," "skip," etc.) as well as control commands ("turn on"), among other examples. Under appropriate conditions, based on detecting one of these command keywords, the NMD 703a performs the corresponding command.

The command keyword engine 771a can employ an automatic speech recognizer 772. The ASR 772 is configured to output phonetic or phenomic representations, such as text corresponding to words, based on sound in the sound-data stream $S_{DS}$ to text. For instance, the ASR 772 may transcribe spoken words represented in the sound-data stream $S_{DS}$ to one or more strings representing the voice input 780 as text. The command keyword engine 771 can feed ASR output (labeled as $S_{ASR}$) to a local natural language unit (NLU) 779 that identifies particular keywords as being command keywords for invoking command-keyword events, as described below.

As noted above, in some example implementations, the NMD 703a is configured to perform natural language processing, which may be carried out using an onboard natural language processor, referred to herein as a natural language unit (NLU) 779. The local NLU 779 is configured to analyze text output of the ASR 772 of the command keyword engine 771a to spot (i.e., detect or identify) keywords in the voice input 780. In FIG. 7A, this output is illustrated as the signal $S_{ASR}$. The local NLU 779 includes a library of keywords (i.e., words and phrases) corresponding to respective commands and/or parameters.

In one aspect, the library of the local NLU 779 includes command keywords. When the local NLU 779 identifies a command keyword in the signal $S_{ASR}$, the command keyword engine 771a generates a command keyword event and performs a command corresponding to the command keyword in the signal $S_{ASR}$, assuming that one or more conditions corresponding to that command keyword are satisfied.

Further, the library of the local NLU 779 may also include keywords corresponding to parameters. The local NLU 779 may then determine an underlying intent from the matched keywords in the voice input 780. For instance, if the local NLU matches the keywords "David Bowie" and "kitchen" in combination with a play command, the local NLU 779 may determine an intent of playing David Bowie in the Kitchen 101h on the playback device 102i. In contrast to a processing of the voice input 780 by a cloud-based VAS, local processing of the voice input 780 by the local NLU 779 may be relatively less sophisticated, as the NLU 779 does not have access to the relatively greater processing capabilities and larger voice databases that a VAS generally has access to.

In some examples, the local NLU 779 may determine an intent with one or more slots, which correspond to respective keywords. For instance, referring back to the play David Bowie in the Kitchen example, when processing the voice input, the local NLU 779 may determine that an intent is to play music (e.g., intent=playMusic), while a first slot includes David Bowie as target content (e.g., slot1=DavidBowie) and a second slot includes the Kitchen 101h as the target playback device (e.g., slot2=kitchen). Here, the intent (to "playMusic") is based on the command keyword and the slots are parameters modifying the intent to a particular target content and playback device.

Within examples, the command keyword engine 771a outputs a signal, $S_{CW}$, that indicates the occurrence of a command keyword event to the local NLU 779. In response to the command keyword event (e.g., in response to the signal $S_{CW}$ indicating the command keyword event), the local NLU 779 is configured to receive and process the signal $S_{ASR}$. In particular, the local NLU 779 looks at the words within the signal $S_{ASR}$ to find keywords that match keywords in the library of the local NLU 779.

Some error in performing local automatic speech recognition is expected. Within examples, the ASR 772 may generate a confidence score when transcribing spoken words to text, which indicates how closely the spoken words in the voice input 780 matches the sound patterns for that word. In some implementations, generating a command keyword event is based on the confidence score for a given command keyword. For instance, the command keyword engine 771a may generate a command keyword event when the confidence score for a given sound exceeds a given threshold value (e.g., 0.5 on a scale of 0-1, indicating that the given sound is more likely than not the command keyword). Conversely, when the confidence score for a given sound is at or below the given threshold value, the command keyword engine 771a does not generate the command keyword event.

Similarly, some error in performing keyword matching is expected. Within examples, the local NLU may generate a confidence score when determining an intent, which indicates how closely the transcribed words in the signal $S_{ASR}$ match the corresponding keywords in the library of the local NLU. In some implementations, performing an operation according to a determined intent is based on the confidence score for keywords matched in the signal $S_{ASR}$. For instance, the NMD 703 may perform an operation according to a determined intent when the confidence score for a given sound exceeds a given threshold value (e.g., 0.5 on a scale of 0-1, indicating that the given sound is more likely than not the command keyword). Conversely, when the confidence score for a given intent is at or below the given threshold value, the NMD 703 does not perform the operation according to the determined intent.

As noted above, in some implementations, a phrase may be used a command keyword, which provides additional syllables to match (or not match). For instance, the phrase "play me some music" has more syllables than "play," which provides additional sound patterns to match to words. Accordingly, command keywords that are phrases may generally be less prone to false wake words.

As indicated above, the NMD 703a generates a command keyword event (and performs a command corresponding to the detected command keyword) only when certain conditions corresponding to a detected command keyword are met. These conditions are intended to lower the prevalence of false positive command keyword events. For instance, after detecting the command keyword "skip," the NMD 703a generates a command keyword event (and skips to the next track) only when certain playback conditions indicating that a skip should be performed are met. These playback conditions may include, for example, (i) a first condition that a media item is being played back, (ii) a second condition that a queue is active, and (iii) a third condition that the queue includes a media item subsequent to the media item being played back. If any of these conditions are not satisfied, the command keyword event is not generated (and no skip is performed).

The NMD 703a includes the one or more state machine(s) 775a to facilitate determining whether the appropriate conditions are met. The state machine 775a transitions between a first state and a second state based on whether one or more conditions corresponding to the detected command keyword are met. In particular, for a given command keyword corresponding to a particular command requiring one or more particular conditions, the state machine 775a transitions into a first state when one or more particular conditions are satisfied and transitions into a second state when at least one condition of the one or more particular conditions is not satisfied.

Within example implementations, the command conditions are based on states indicated in state variables. As noted above, the devices of the MPS 100 may store state variables describing the state of the respective device. For instance, the playback devices 102 may store state variables indicating the state of the playback devices 102, such as the audio content currently playing (or paused), the volume levels, network connection status, and the like). These state variables are updated (e.g., periodically, or based on an event (i.e., when a state in a state variable changes)) and the state variables further can be shared among the devices of the MPS 100, including the NMD 703.

Similarly, the NMD 703 may maintain these state variables (either by virtue of being implemented in a playback device or as a stand-alone NMD). The state machine 775a monitors the states indicated in these state variables, and determines whether the states indicated in the appropriate state variables indicate that the command condition(s) are satisfied. Based on these determinations, the state machine 775a transitions between the first state and the second state, as described above.

In some implementations, the command-keyword engine 771 may be disabled unless certain conditions have been met via the state machines. For example, the first state and the second state of the state machine 775a may operate as enable/disable toggles to the command keyword engine 771a. In particular, while a state machine 775a corresponding to a particular command keyword is in the first state, the state machine 775a enables the command keyword engine 771a of the particular command keyword. Conversely, while the state machine 775a corresponding to the particular command keyword is in the second state, the state machine 775a disables the command keyword engine 771a of the particular command keyword. Accordingly, the disabled command keyword engine 771a ceases analyzing the sound-data stream Sm. In such cases when at least one command condition is not satisfied, the NMD 703a may suppress generation of command keyword event when the command keyword engine 771a detects a command keyword. Suppressing generation may involve gating, blocking or otherwise preventing output from the command keyword engine 771a from generating the command keyword event. Alternatively, suppressing generation may involve the NMD 703 ceasing to feed the sound-data stream $S_{DS}$ to the ASR 772. Such suppression prevents a command corresponding to the detected command keyword from being performed when at least one command condition is not satisfied. In such embodiments, the command keyword engine 771a may continue analyzing the sound-data stream $S_{DS}$ while the state machine 775a is in the first state, but command keyword events are disabled.

Other example conditions may be based on the output of a voice activity detector ("VAD") 765. The VAD 765 is configured to detect the presence (or lack thereof) of voice activity in the sound-data stream Sm. In particular, the VAD 765 may analyze frames corresponding to the pre-roll portion of the voice input 780 (FIG. 2D) with one or more voice detection algorithms to determine whether voice activity was present in the environment in certain time windows prior to a keyword portion of the voice input 780.

The VAD 765 may utilize any suitable voice activity detection algorithms. Example voice detection algorithms involve determining whether a given frame includes one or more features or qualities that correspond to voice activity, and further determining whether those features or qualities diverge from noise to a given extent (e.g., if a value exceeds a threshold for a given frame). Some example voice detection algorithms involve filtering or otherwise reducing noise in the frames prior to identifying the features or qualities.

In some examples, the VAD 765 may determine whether voice activity is present in the environment based on one or more metrics. For example, the VAD 765 can be configured distinguish between frames that include voice activity and frames that don't include voice activity. The frames that the VAD determines have voice activity may be caused by speech regardless of whether it near- or far-field. In this example and others, the VAD 765 may determine a count of frames in the pre-roll portion of the voice input 780 that indicate voice activity. If this count exceeds a threshold percentage or number of frames, the VAD 765 may be configured to output a signal or set a state variable indicating that voice activity is present in the environment. Other metrics may be used as well in addition to, or as an alternative to, such a count.

The presence of voice activity in an environment may indicate that a voice input is being directed to the NMD 73. Accordingly, when the VAD 765 indicates that voice activity is not present in the environment (perhaps as indicated by a state variable set by the VAD 765) this may be configured as one of the command conditions for the command keywords. When this condition is met (i.e., the VAD 765 indicates that voice activity is present in the environment), the state machine 775a will transition to the first state to enable performing commands based on command keywords, so long as any other conditions for a particular command keyword are satisfied.

Further, in some implementations, the NMD 703 may include a noise classifier 766. The noise classifier 766 is configured to determine sound metadata (frequency response, signal levels, etc.) and identify signatures in the sound metadata corresponding to various noise sources. The noise classifier 766 may include a neural network or other mathematical model configured to identify different types of noise in detected sound data or metadata. One classification of noise may be speech (e.g., far-field speech). Another classification, may be a specific type of speech, such as background speech, and example of which is described in greater detail with reference to FIG. 8. Background speech may be differentiated from other types of voice-like activity, such as more general voice activity (e.g., cadence, pauses, or other characteristics) of voice-like activity detected by the VAD 765.

For example, analyzing the sound metadata can include comparing one or more features of the sound metadata with known noise reference values or a sample population data with known noise. For example, any features of the sound metadata such as signal levels, frequency response spectra, etc. can be compared with noise reference values or values collected and averaged over a sample population. In some examples, analyzing the sound metadata includes projecting the frequency response spectrum onto an eigenspace corresponding to aggregated frequency response spectra from a population of NMDs. Further, projecting the frequency response spectrum onto an eigenspace can be performed as a pre-processing step to facilitate downstream classification.

In various embodiments, any number of different techniques for classification of noise using the sound metadata can be used, for example machine learning using decision trees, or Bayesian classifiers, neural networks, or any other classification techniques. Alternatively or additionally, various clustering techniques may be used, for example K-Means clustering, mean-shift clustering, expectation-maximization clustering, or any other suitable clustering technique. Techniques to classify noise may include one or more techniques disclosed in U.S. application Ser. No. 16/227,308 filed Dec. 20, 2018, and titled "Optimization of Network Microphone Devices Using Noise Classification," which is herein incorporated by reference in its entirety.

Figure 8:
FIG. 8 shows example noise graphs illustrating analyzed sound metadata associated with background speech.

To illustrate, FIG. 8 shows a first plot 882*a* and a second plot 882*b*. The first plot 882*a* and the second plot 882*b* show analyzed sound metadata associated with background speech. These signatures shown in the plots are generated using principal component analysis (PCA). Collected data from a variety of NMDs provides an overall distribution of possible frequency response spectra. In general, principal component analysis can be used to find the orthogonal basis that describes the variance in all the field data. This eigenspace is reflected in the contours shown in the plots of FIG. 8. Each dot in the plot represents a known noise value (e.g., a single frequency response spectrum from an NMD exposed to the noted noise source) that is projected onto the eigenspace. As seen in FIG. 8, these known noise values cluster together when projected onto the eigenspace. In this example, the FIG. 8 plots are representative of a four vector analysis, where each vector corresponds to a respective feature. The features collectively are a signature for background speech.

Referring back to FIG. 7A, in some implementations, the additional buffer 769 (shown in dashed lines) may store information (e.g., metadata or the like) regarding the detected sound $S_D$ that was processed by the upstream AEC 763 and spatial processor 764. This additional buffer 769 may be referred to as a "sound metadata buffer." Examples of such sound metadata include: (1) frequency response data, (2) echo return loss enhancement measures, (3) voice direction measures; (4) arbitration statistics; and/or (5) speech spectral data. In example implementations, the noise classifier 766 may analyze the sound metadata in the buffer 769 to classify noise in the detected sound $S_D$.

As noted above, one classification of sound may be background speech, such as speech indicative of far-field speech and/or speech indicative of a conversation not involving the NMD 703. The noise classifier 766 may output a signal and/or set a state variable indicating that background speech is present in the environment. The presence of voice activity (i.e., speech) in the pre-roll portion of the voice input 780 indicates that the voice input 780 might not be directed to the NMD 703, but instead be conversational speech within the environment. For instance, a household member might speak something like "our kids should have a play date soon" without intending to direct the command keyword "play" to the NMD 703.

Further, when the noise classifier indicates that background speech is present is present in the environment, this condition may disable the command keyword engine 771*a*. In some implementations, the condition of background speech being absent in the environment (perhaps as indicated by a state variable set by the noise classifier 766) is configured as one of the command conditions for the command keywords. Accordingly, the state machine 775*a* will not transition to the first state when the noise classifier 766 indicates that background speech is present in the environment.

Further, the noise classifier 766 may determine whether background speech is present in the environment based on one or more metrics. For example, the noise classifier 766 may determine a count of frames in the pre-roll portion of the voice input 780 that indicate background speech. If this count exceeds a threshold percentage or number of frames, the noise classifier 766 may be configured to output the signal or set the state variable indicating that background speech is present in the environment. Other metrics may be used as well in addition to, or as an alternative to, such a count.

Within example implementations, the NMD 703*a* may support a plurality of command keywords. To facilitate such support, the command keyword engine 771*a* may implement multiple identification algorithms corresponding to respective command keywords. Alternatively, the NMD 703*a* may implement additional command keyword engines 771*b* configured to identify respective command keywords. Yet further, the library of the local NLU 779 may include a plurality of command keywords and be configured to search for text patterns corresponding to these command keywords in the signal $S_{ASR}$.

Further, command keywords may require different conditions. For instance, the conditions for "skip" may be different than the conditions for "play" as "skip" may require that the condition that a media item is being played back and play may require the opposite condition that a media item is not being played back. To facilitate these respective conditions, the NMD 703*a* may implement respective state machines 775*a* corresponding to each command keyword. Alternatively, the NMD 703*a* may implement a state machine 775*a* having respective states for each command keyword. Other examples are possible as well.

In some example implementations, the VAS wake-word engine 770*a* generates a VAS wake-word event when certain conditions are met. The NMD 703*b* includes a state machine 775*b*, which is similar to the state machine 775*a*. The state machine 775*b* transitions between a first state and a second state based on whether one or more conditions corresponding to the VAS wake word are met.

For instance, in some examples, the VAS wake-word engine 770a may generate a VAS wake word event only when background speech was not present in the environment before a VAS wake-word event was detected. An indication of whether voice activity is present in the environment may come from the noise classifier 766. As noted above, the noise classifier 766 may be configured to output a signal or set a state variable indicating that far-field speech is present in the environment. Yet further, the VAS wake-word engine 770a may generate a VAS wake word event only when voice activity is present in the environment. As indicated above, the VAD 765 may be configured to output a signal or set a state variable indicating that voice activity is present in the environment.

To illustrate, as shown in FIG. 7B, the VAS wake-word engine 770a is connected to the state machines 775b. The state machine 775b may remain in a first state when one or more conditions are met, which may include a condition of voice activity not being present in the environment. When the state machine 775b is in the first state, the VAS wake-word engine 770a is enabled and will generate VAS wake-word events. If any of the one or more conditions are not met, the state machine 775b transitions to a second state, which disables the VAS wake-word engine 770a.

Yet further, the NMD 703 may include one or more sensors that output a signal indicating whether one or more users are in proximity to the NMD 703. Example sensors include a temperature sensor, an infrared sensor, an imaging sensor, and/or a capacitive sensor, among other examples. The NMD 703 may use output from such sensors to set one or more state variables indicating whether one or more users are in proximity to the NMD 703. Then, the state machine 775b may use the presence or lack thereof as a condition for the state machine 775b. For instance, the state machine 775b may enable the VAS wake-word engine and/or the command keyword engine 771a when at least one user is in proximity to the NMD 703.

Figure 7C:
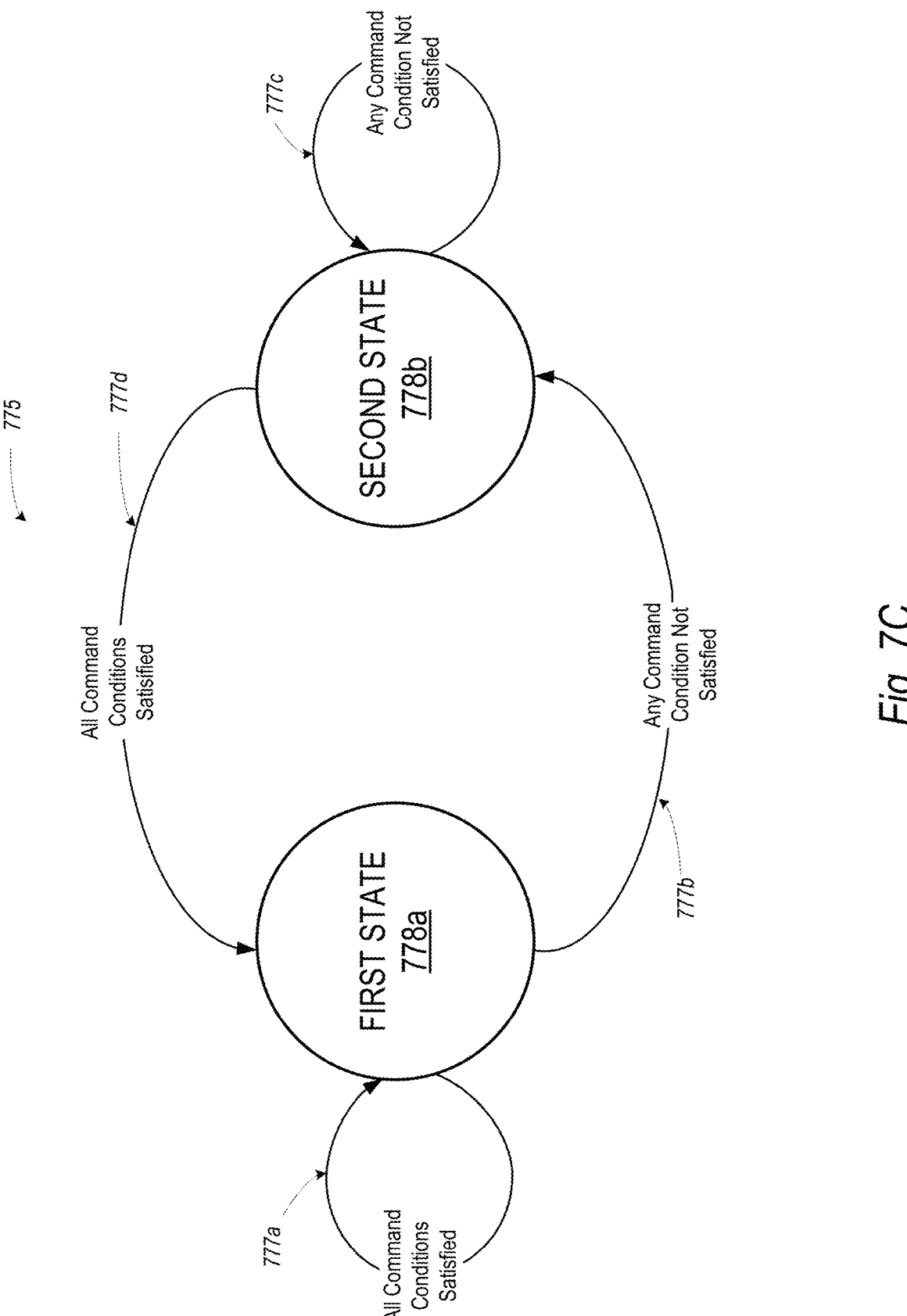
FIG. 7C is a functional block diagram illustrating an example state machine in accordance with aspects of the disclosure.

To illustrate exemplary state machine operation, FIG. 7C is a block diagram illustrating the state machine 775 for an example command keyword requiring one or more command conditions. At 777a, the state machine 775 remains in the first state 778a while all the command conditions are satisfied. While the state machine 775 remains in the first state 778a (and all command conditions are met), the NMD 703a will generate a command keyword event when the command keyword is detected by the command keyword engine 771a.

At 777b, the state machine 775 transitions into the second state 778b when any command condition is not satisfied. At 777c, the state machine 775 remains in the second state 778b while any command condition is not satisfied. While the state machine 775 remains in the second state 778b, the NMD 703a will not act on the command keyword event when the command keyword is detected by the command keyword engine 771a.

Referring back to FIG. 7A, in some examples, the one or more additional command keyword engines 771b may include custom command keyword engines. Cloud service providers, such as streaming audio services, may provide a custom keyword engine pre-configured with identification algorithms configured to spot service-specific command keywords. These service-specific command keywords may include commands for custom service features and/or custom names used in accessing the service.

For instance, the NMD 703a may include a particular streaming audio service (e.g., Apple Music) command keyword engine 771b. This particular command keyword engine 771b may be configured to detect command keywords specific to the particular streaming audio service and generate streaming audio service wake word events. For instance, one command keyword may be "Friends Mix," which corresponds to a command to play back a custom playlists generated from playback histories of one or more "friends" within the particular streaming audio service.

A custom command keyword engine 771b may be relatively more prone to false wake words than the VAS wake-word engine 770a, as generally the VAS wake-word engine 770a is more sophisticated than a custom command keyword engine 771b. To mitigate this, custom command keywords may require one or more conditions to be satisfied before generating a custom command keyword event. Further, in some implementations, in an effort to reduce the prevalence of false positives, multiple conditions may be imposed as a requirement to include a custom command keyword engine 771b in the NMD 703a.

These custom command keyword conditions may include service-specific conditions. For instance, command keywords corresponding to premium features or playlists may require a subscription as a condition. As another example, custom command keywords corresponding to a particular streaming audio service may require media items from that streaming audio service in the playback queue. Other conditions are possible as well.

To gate custom command keyword engines based on the custom command keyword conditions, the NMD 703a may additional state machines 775a corresponding to each custom command keyword. Alternatively, the NMD 703a may implement a state machine 775a having respective states for each custom command keyword. Other examples are possible as well. These custom command conditions may depend on the state variables maintained by the devices within the MPS 100, and may also depend on state variables or other data structures representing a state of a user account of a cloud service, such as a streaming audio service.

FIGS. 9A and 9B show a table 985 illustrating exemplary command keywords and corresponding conditions. As shown in the Figures, example command keywords may include cognates having similar intent and requiring similar conditions. For instance, the "next" command keyword has cognates of "skip" and "forward," each of which invokes a skip command under appropriate conditions. The conditions shown in the table 985 are illustrative; various implementations may use different conditions.

Referring back to FIG. 7A, in example embodiments, the VAS wake-word engine 770a and the command keyword engine 771a may take a variety of forms. For example, the VAS wake-word engine 770a and the command keyword engine 771a may take the form of one or more modules that are stored in memory of the NMD 703a and/or the NMD 703b (e.g., the memory 112b of FIG. 1F). As another example, the VAS wake-word engine 770a and the command keyword engine 771a may take the form of a general-purposes or special-purpose processor, or modules thereof. In this respect, multiple wake-word engines 770 and 771 may be part of the same component of the NMD 703a or each wake-word engine 770 and 771 may take the form of a component that is dedicated for the particular wake-word engine. Other possibilities also exist.

To further reduce false positives, the command keyword engine 771a may utilize a relative low sensitivity compared with the VAS wake-word engine 770a. In practice, a wakeword engine may include a sensitivity level setting that is modifiable. The sensitivity level may define a degree of similarity between a word identified in the detected sound stream $S_{DS1}$ and the wake-word engine's one or more particular wake words that is considered to be a match (i.e., that triggers a VAS wake-word or command keyword event). In other words, the sensitivity level defines how closely, as one example, the spectral characteristics in the detected sound stream $S_{DS2}$ must match the spectral characteristics of the engine's one or more wake words to be a wake-word trigger.

In this respect, the sensitivity level generally controls how many false positives that the VAS wake-word engine 770a and command keyword engine 771a identifies. For example, if the VAS wake-word engine 770a is configured to identify the wake-word "Alexa" with a relatively high sensitivity, then false wake words of "Election" or "Lexus" may cause the wake-word engine 770a to flag the presence of the wake-word "Alexa." In contrast, if the command keyword engine 771a is configured with a relatively low sensitivity, then the false wake words of "may" or "day" would not cause the command keyword engine 771a to flag the presence of the command keyword "Play."

In practice, a sensitivity level may take a variety of forms. In example implementations, a sensitivity level takes the form of a confidence threshold that defines a minimum confidence (i.e., probability) level for a wake-word engine that serves as a dividing line between triggering or not triggering a wake-word event when the wake-word engine is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a wake-word engine's confidence threshold configures it to trigger a wake-word event when it identifies words that have a lower likelihood that they are the actual particular wake word, whereas raising the confidence threshold configures the engine to trigger a wake-word event when it identifies words that have a higher likelihood that they are the actual particular wake word. Within examples, a sensitivity level of the command keyword engine 771a may be based on more or more confidence scores, such as the confidence score in spotting a command keyword and/or a confidence score in determining an intent. Other examples of sensitivity levels are also possible.

In example implementations, sensitivity level parameters (e.g., the range of sensitivities) for a particular wake-word engine can be updated, which may occur in a variety of manners. As one possibility, a VAS or other third-party provider of a given wake-word engine may provide to the NMD 703 a wake-word engine update that modifies one or more sensitivity level parameters for the given VAS wake-word engine 770a. By contrast, the sensitive level parameters of the command keyword engine 771a may be configured by the manufacturer of the NMD 703a or by another cloud service (e.g., for a custom wake-word engine 771b).

Notably, within certain examples, the NMD 703a foregoes sending any data representing the detected sound $S_D$ (e.g., the messages $M_V$) to a VAS when processing a voice input 780 including a command keyword. In implementations including the local NLU 779, the NMD 703a can further process the voice utterance portion of the voice input 780 (in addition to the keyword word portion) without necessarily sending the voice utterance portion of the voice input 780 to the VAS. Accordingly, speaking a voice input 780 (with a command keyword) to the NMD 703 may provide increased privacy relative to other NMDs that process all voice inputs using a VAS.

As indicated above, the keywords in the library of the local NLU 779 correspond to parameters. These parameters may define to perform the command corresponding to the detected command keyword. When keywords are recognized in the voice input 780, the command corresponding to the detected command keyword is performed according to parameters corresponding to the detected keywords.

For instance, an example voice input 780 may be "play music at low volume" with "play" being the command keyword portion (corresponding to a playback command) and "music at low volume" being the voice utterance portion. When analyzing this voice input 780, the NLU 779 may recognize that "low volume" is a keyword in its library corresponding to a parameter representing a certain (low) volume level. Accordingly, the NLU 779 may determine an intent to play at this lower volume level. Then, when performing the playback command corresponding to "play," this command is performed according to the parameter representing a certain volume level.

In a second example, another example voice input 780 may be "play my favorites in the Kitchen" with "play" again being the command keyword portion (corresponding to a playback command) and "my favorites in the Kitchen" as the voice utterance portion. When analyzing this voice input 780, the NLU 779 may recognize that "favorites" and "Kitchen" match keywords in its library. In particular, "favorites" corresponds to a first parameter representing particular audio content (i.e., a particular playlist that includes a user's favorite audio tracks) while "Kitchen" corresponds to a second parameter representing a target for the playback command (i.e., the kitchen 101h zone. Accordingly, the NLU 779 may determine an intent to play this particular playlist in the kitchen 101h zone.

In a third example, a further example voice input 780 may be "volume up" with "volume" being the command keyword portion (corresponding to a volume adjustment command) and "up" being the voice utterance portion. When analyzing this voice input 780, the NLU 779 may recognize that "up" is a keyword in its library corresponding to a parameter representing a certain volume increase (e.g., a 10 point increase on a 100 point volume scale). Accordingly, the NLU 779 may determine an intent to increase volume. Then, when performing the volume adjustment command corresponding to "volume," this command is performed according to the parameter representing the certain volume increase.

Within examples, certain command keywords are functionally linked to a subset of the keywords within the library of the local NLU 779, which may hasten analysis. For instance, the command keyword "skip" may be functionality linked to the keywords "forward" and "backward" and their cognates. Accordingly, when the command keyword "skip" is detected in a given voice input 780, analyzing the voice utterance portion of that voice input 780 with the local NLU 779 may involve determining whether the voice input 780 includes any keywords that match these functionally linked keywords (rather than determining whether the voice input 780 includes any keywords that match any keyword in the library of the local NLU 779). Since vastly fewer keywords are checked, this analysis is relatively quicker than a full search of the library. By contrast, a nonce VAS wake word such as "Alexa" provides no indication as to the scope of the accompanying voice input.

Some commands may require one or more parameters, as such the command keyword alone does not provide enough information to perform the corresponding command. For example, the command keyword "volume" might require a parameter to specify a volume increase or decrease, as the intent of "volume" of volume alone is unclear. As another example, the command keyword "group" may require two or more parameters identifying the target devices to group.

Accordingly, in some example implementations, when a given command keyword is detected in the voice input 780 by the command keyword engine 771a, the local NLU 779 may determine whether the voice input 780 includes keywords matching keywords in the library corresponding to the required parameters. If the voice input 780 does include keywords matching the required parameters, the NMD 703a proceeds to perform the command (corresponding to the given command keyword) according to the parameters specified by the keywords.

However, if the voice input 780 does include keywords matching the required parameters for the command, the NMD 703a may prompt the user to provide the parameters. For instance, in a first example, the NMD 703a may play an audible prompt such as "I've heard a command, but I need more information" or "Can I help you with something?" Alternatively, the NMD 703a may send a prompt to a user's personal device via a control application (e.g., the software components 132c of the control device(s) 104).

In further examples, the NMD 703a may play an audible prompt customized to the detected command keyword. For instance, after detect a command keyword corresponding to a volume adjustment command (e.g., "volume"), the audible prompt may include a more specific request such as "Do you want to adjust the volume up or down?" As another example, for a grouping command corresponding to the command keyword "group," the audible prompt may be "Which devices do you want to group?" Supporting such specific audible prompts may be made practicable by supporting a relatively limited number of command keywords (e.g., less than 100), but other implementations may support more command keywords with the trade-off of requiring additional memory and processing capability.

Within additional examples, when a voice utterance portion does not include keywords corresponding to one or more required parameters, the NMD 703a may perform the corresponding command according to one or more default parameters. For instance, if a playback command does not include keywords indicating target playback devices 102 for playback, the NMD 703a may default to playback on the NMD 703a itself (e.g., if the NMD 703a is implemented within a playback device 102) or to playback on one or more associated playback devices 102 (e.g., playback devices 102 in the same room or zone as the NMD 703a). Further, in some examples, the user may configure default parameters using a graphical user interface (e.g., user interface 430) or voice user interface. For example, if a grouping command does not specify the playback devices 102 to group, the NMD 703a may default to instructing two or more pre-configured default playback devices 102 to form a synchrony group. Default parameters may be stored in data storage (e.g., the memory 112b (FIG. 1F)) and accessed when the NMD 703a determines that keywords exclude certain parameters. Other examples are possible as well.

In some cases, the NMD 703a sends the voice input 780 to a VAS when the local NLU 779 is unable to process the voice input 780 (e.g., when the local NLU is unable to find matches to keywords in the library, or when the local NLU 779 has a low confidence score as to intent). In an example, to trigger sending the voice input 780, the NMD 703a may generate a bridging event, which causes the voice extractor 773 to process the sound-data stream $S_D$, as discussed above. That is, the NMD 703a generates a bridging event to trigger the voice extractor 773 without a VAS wake-word being detected by the VAS wake-word engine 770a (instead based on a command keyword in the voice input 780, as well as the NLU 779 being unable to process the voice input 780).

Before sending the voice input 780 to the VAS (e.g., via the messages $M_V$), the NMD 703a may obtain confirmation from the user that the user acquiesces to the voice input 780 being sent to the VAS. For instance, the NMD 703a may play an audible prompt to send the voice input to a default or otherwise configured VAS, such as "I'm sorry, I didn't understand that. May I ask Alexa?" In another example, the NMD 703a may play an audible prompt using a VAS voice (i.e., a voice that is known to most users as being associated with a particular VAS), such as "Can I help you with something?" In such examples, generation of the bridging event (and trigging of the voice extractor 773) is contingent on a second affirmative voice input 780 from the user.

Within certain example implementations, the local NLU 779 may process the signal $S_{ASR}$ without necessarily a command keyword event being generated by the command keyword engine 771a (i.e., directly). That is, the automatic speech recognition 772 may be configured to perform automatic speech recognition on the sound-data stream $S_D$, which the local NLU 779 processes for matching keywords without requiring a command keyword event. If keywords in the voice input 780 are found to match keywords corresponding to a command (possibly with one or more keywords corresponding to one or more parameters), the NMD 703a performs the command according to the one or more parameters.

Further, in such examples, the local NLU 779 may process the signal $S_{ASR}$ directly only when certain conditions are met. In particular, in some embodiments, the local NLU 779 processes the signal $S_{ASR}$ only when the state machine 775a is in the first state. The certain conditions may include a condition corresponding to no background speech in the environment. An indication of whether background speech is present in the environment may come from the noise classifier 766. As noted above, the noise classifier 766 may be configured to output a signal or set a state variable indicating that far-field speech is present in the environment. Further, another condition may corresponding to voice activity in the environment. The VAD 765 may be configured to output a signal or set a state variable indicating that voice activity is present in the environment. Similarly, The prevalence of false positive detection of commands with a direct processing approach may be mitigated using the conditions determined by the state machine 775a.

In some examples, the library of the local NLU 779 is partially customized to the individual user(s). In a first aspect, the library may be customized to the devices that are within the household of the NMD (e.g., the household within the environment 101 (FIG. 1A)). For instance, the library of the local NLU may include keywords corresponding to the names of the devices within the household, such as the zone names of the playback devices 102 in the MPS 100. In a second aspect, the library may be customized to the users of the devices within the household. For example, the library of the local NLU 779 may include keywords corresponding to names or other identifiers of a user's preferred playlists, artists, albums, and the like. Then, the user may refer to these names or identifiers when directing voice inputs to the command keyword engine 771a and the local NLU 779.

Within example implementations, the NMD 703a may populate the library of the local NLU 779 locally within the network 111 (FIG. 1B). As noted above, the NMD 703*a* may maintain or have access to state variables indicating the respective states of devices connected to the network 111 (e.g., the playback devices 104). These state variables may include names of the various devices. For instance, the kitchen 101*h* may include the playback device 101*b*, which are assigned the zone name "Kitchen." The NMD 703*a* may read these names from the state variables and include them in the library of the local NLU 779 by training the local NLU 779 to recognize them as keywords. The keyword entry for a given name may then be associated with the corresponding device in an associated parameter (e.g., by an identifier of the device, such as a MAC address or IP address). The NMD 703*a* can then use the parameters to customize control commands and direct the commands to a particular device.

In further examples, the NMD 703*a* may populate the library by discovering devices connected to the network 111. For instance, the NMD 703*a* may transmit discovery requests via the network 111 according to a protocol configured for device discovery, such as universal plug-and-play (UPnP) or zero-configuration networking. Devices on the network 111 may then respond to the discovery requests and exchange data representing the device names, identifiers, addresses and the like to facilitate communication and control via the network 111. The NMD 703*a* may read these names from the exchanged messages and include them in the library of the local NLU 779 by training the local NLU 779 to recognize them as keywords.

Figure 10:
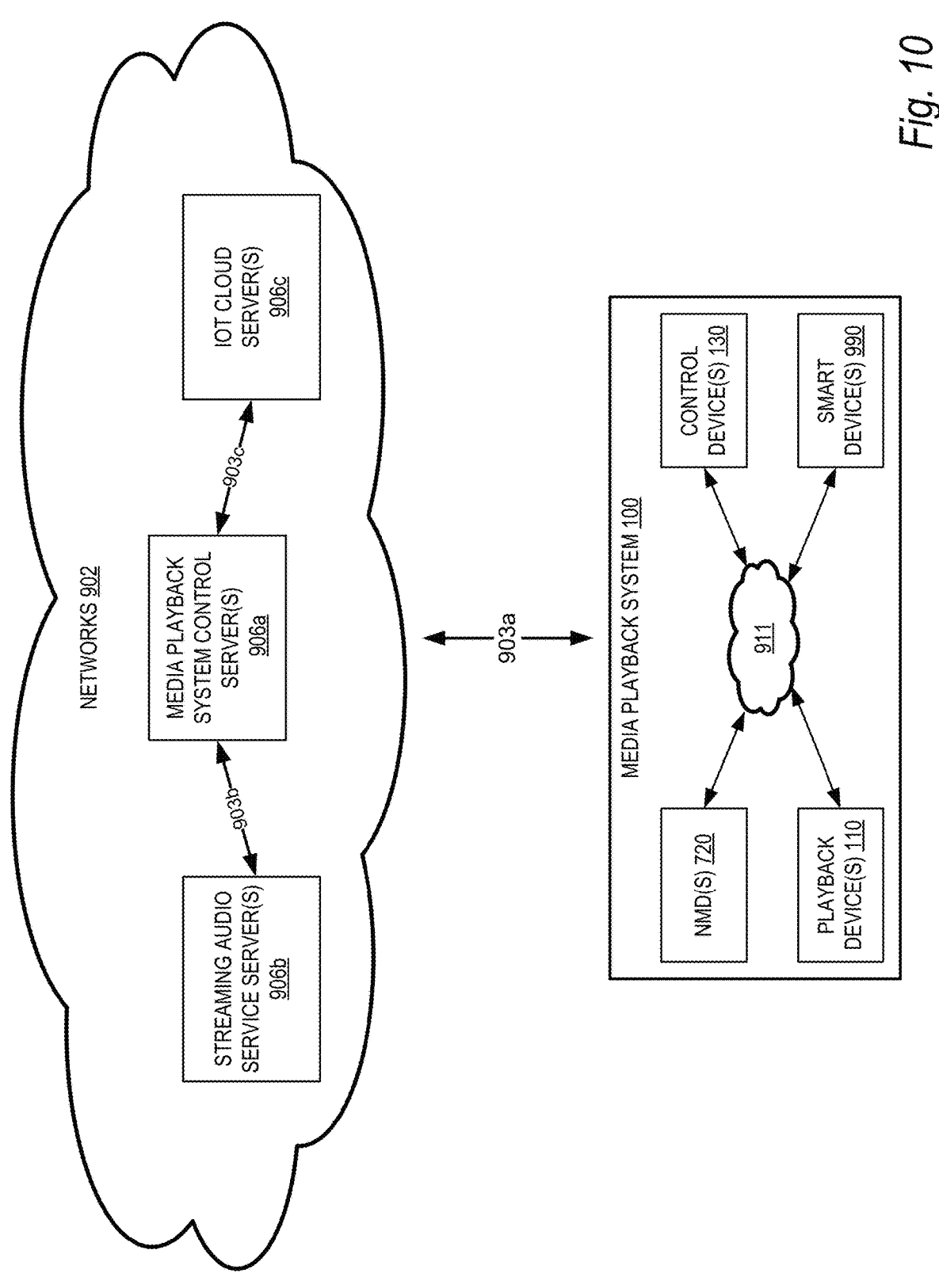
FIG. 10 is a schematic diagram illustrating an example media playback system and cloud network in accordance with aspects of the disclosure.

In further examples, the NMD 703*a* may populate the library using the cloud. To illustrate, FIG. 10 is a schematic diagram of the MPS 100 and a cloud network 902. The cloud network 902 includes cloud servers 906, identified separately as media playback system control servers 906*a*, streaming audio service servers 906*b*, and IOT cloud servers 906*c*. The streaming audio service servers 906*b* may represent cloud servers of different streaming audio services. Similarly, the IOT cloud servers 906*c* may represent cloud servers corresponding to different cloud services supporting smart devices 990 in the MPS 100.

One or more communication links 903*a*, 903*b*, and 903*c* (referred to hereinafter as "the links 903") communicatively couple the MPS 100 and the cloud servers 906. The links 903 can include one or more wired networks and one or more wireless networks (e.g., the Internet). Further, similar to the network 111 (FIG. 1B), a network 911 communicatively couples the links 903 and at least a portion of the devices (e.g., one or more of the playback devices 102, NMDs 103 and 703*a*, control devices 104, and/or smart devices 990) of the MPS 100.

In some implementations, the media playback system control servers 906*a* facilitate populating the library of local NLU 779 with the NMD(s) 703*a* (representing one or more of the NMD 703*a* (FIG. 7A) within the MPS 100). In an example, the media playback system control servers 906*a* may receive data representing a request to populate the library of a local NLU 779 from the NMD 703*a*. Based on this request, the media playback system control servers 906*a* may communicate with the streaming audio service servers 906*b* and/or IOT cloud servers 906*c* to obtain keywords specific to the user.

In some examples, the media playback system control servers 906*a* may utilize user accounts and/or user profiles in obtaining keywords specific to the user. As noted above, a user of the MPS 100 may set-up a user profile to define settings and other information within the MPS 100. The user profile may then in turn be registered with user accounts of one or more streaming audio services to facilitate streaming audio from such services to the playback devices 102 of the MPS 100.

Through use of these registered streaming audio services, the streaming audio service servers 906*b* may collect data indicating a user's saved or preferred playlists, artists, albums, tracks, and the like, either via usage history or via user input (e.g., via a user input designating a media item as saved or a favorite). This data may be stored in a database on the streaming audio service servers 906*b* to facilitate providing certain features of the streaming audio service to the user, such as custom playlists, recommendations, and similar features. Under appropriate conditions (e.g., after receiving user permission), the streaming audio service servers 906*b* may share this data with the media playback system control servers 906*a* over the links 903*b*.

Accordingly, within examples, the media playback system control servers 906*a* may maintain or have access to data indicating a user's saved or preferred playlists, artists, albums, tracks, genres, and the like. If a user has registered their user profile with multiple streaming audio services, the saved data may include saved playlists, artists, albums, tracks, and the like from two or more streaming audio services. Further, the media playback system control servers 906*a* may develop a more complete understanding of the user's preferred playlists, artists, albums, tracks, and the like by aggregating data from the two or more streaming audio services, as compared with a streaming audio service that only has access to data generated through use of its own service.

Moreover, in some implementations, in addition to the data shared from the streaming audio service servers 906*b*, the media playback system control servers 906*a* may collect usage data from the MPS 100 over the links 903*a*, after receiving user permission. This may include data indicating a user's saved or preferred media items on a zone basis. Different types of music may be preferred in different rooms. For instance, a user may prefer upbeat music in the Kitchen 101*h* and more mellow music to assist with focus in the Office 101*e*.

Using the data indicating a user's saved or preferred playlists, artists, albums, tracks, and the like, the media playback system control servers 906*a* may identify names of playlists, artists, albums, tracks, and the like that the user is likely to refer to when providing playback commands to the NMDs 703*a* via voice input. Data representing these names can then be transmitted via the links 903*a* and the network 904 to the NMDs 703*a* and then added to the library of the local NLU 779 as keywords. For instance, the media playback system control servers 906*a* may send instructions to the NMDs 703*a* to include certain names as keywords in the library of the local NLU 779. Alternatively, the NMDs 703*a* (or another device of the MPS 100) may identify names of playlists, artists, albums, tracks, and the like that the user is likely to refer to when providing playback commands to the NMDs 703*a* via voice input and then include these names in the library of the local NLU 779.

Due to such customization, similar voice inputs may result in different operations being performed when the voice input is processed by the local NLU 779 as compared with processing by a VAS. For instance, a first voice input of "Alexa, play me my favorites in the Office" may trigger a VAS wake-word event, as it includes a VAS wake word ("Alexa"). A second voice input of "Play me my favorites in the Office" may trigger a command keyword, as it includes a command keyword ("play"). Accordingly, the first voice input is sent by the NMD 703*a* to the VAS, while the second voice input is processed by the local NLU 779.

While these voice inputs are nearly identical, they may cause different operations. In particular, the VAS may, to the best of its ability, determine a first playlist of audio tracks to add to a queue of the playback device 102*f* in the office 101*e*. Similarly, the local NLU 779 may recognize keywords "favorites" and "kitchen" in the second voice input. Accordingly, the NMD 703*a* performs the voice command of "play" with parameters of <favorites playlist> and <kitchen 101*h* zone>, which causes a second playlist of audio tracks to be added to the queue of the playback device 102*f* in the office 101*e*. However, the second playlist of audio tracks may include a more complete and/or more accurate collection of the user's favorite audio tracks, as the second playlist of audio tracks may draw on data indicating a user's saved or preferred playlists, artists, albums, and tracks from multiple streaming audio services, and/or the usage data collected by the media playback system control servers 906*a*. In contrast, the VAS may draw on its relatively limited conception of the user's saved or preferred playlists, artists, albums, and tracks when determining the first playlist.

To illustrate, FIG. 11 shows a table 1100 illustrating the respective contents of a first and second playlist determined based on similar voice inputs, but processed differently. In particular, the first playlist is determined by a VAS while the second playlist is determined by the NMD 703*a* (perhaps in conjunction with the media playback system control servers 906*a*). As shown, while both playlists purport to include a user's favorites, the two playlists include audio content from dissimilar artists and genres. In particular, the second playlist is configured according to usage of the playback device 102*f* in the Office 101*e* and also the user's interactions with multiple streaming audio services, while the first playlist is based on the multiple user's interactions with the VAS. As a result, the second playlist is more attuned to the types of music that the user prefers to listen to in the office 101*e* (e.g., indie rock and folk) while the first playlist is more representative of the interactions with the VAS as a whole.

A household may include multiple users. Two or more users may configure their own respective user profiles with the MPS 100. Each user profile may have its own user accounts of one or more streaming audio services associated with the respective user profile. Further, the media playback system control servers 906*a* may maintain or have access to data indicating each user's saved or preferred playlists, artists, albums, tracks, genres, and the like, which may be associated with the user profile of that user.

In various examples, names corresponding to user profiles may be populated in the library of the local NLU 779. This may facilitate referring to a particular user's saved or preferred playlists, artists, albums, tracks, or genres. For instance, when a voice input of "Play Anne's favorites on the patio" is processed by the local NLU 779, the local NLU 779 may determine that "Anne" matches a stored keyword corresponding to a particular user. Then, when performing the playback command corresponding to that voice input, the NMD 703*a* adds a playlist of that particular user's favorite audio tracks to the queue of the playback device 102*c* in the patio 101*i*.

In some cases, a voice input might not include a keyword corresponding to a particular user, but multiple user profiles are configured with the MPS 100. In some cases, the NMD 703*a* may determine the user profile to use in performing a command using voice recognition. Alternatively, the NMD 703*a* may default to a certain user profile. Further, the NMD 703*a* may use preferences from the multiple user profiles when performing a command corresponding to a voice input that did not identify a particular user profile. For instance, the NMD 703*a* may determine a favorites playlist including preferred or saved audio tracks from each user profile registered with the MPS 100.

The IOT cloud servers 906*c* may be configured to provide supporting cloud services to the smart devices 990. The smart devices 990 may include various "smart" internet-connected devices, such as lights, thermostats, cameras, security systems, appliances, and the like. For instance, an IOT cloud server 906*c* may provide a cloud service supporting a smart thermostat, which allows a user to control the smart thermostat over the internet via a smartphone app or website.

Accordingly, within examples, the IOT cloud servers 906*c* may maintain or have access to data associated with a user's smart devices 990, such as device names, settings, and configuration. Under appropriate conditions (e.g., after receiving user permission), the IOT cloud servers 906*c* may share this data with the media playback system control servers 906*a* and/or the NMD 703*a* via the links 903*c*. For instance, the IOT cloud servers 906*c* that provide the smart thermostat cloud service may provide data representing such keywords to the NMD 703*a*, which facilitates populating the library of the local NLU 779 with keywords corresponding to the temperature.

Yet further, in some cases, the IOT cloud servers 906*c* may also provide keywords specific to control of their corresponding smart devices 990. For instance, the IOT cloud server 906*c* that provides the cloud service supporting the smart thermostat may provide a set of keywords corresponding to voice control of a thermostat, such as "temperature," "warmer," or "cooler," among other examples. Data representing such keywords may be sent to the NMDs 703*a* over the links 903 and the network 904 from the IOT cloud servers 906*c*.

As noted above, some households may include more than NMD 703*a*. In example implementations, two or more NMDs 703*a* may synchronize or otherwise update the libraries of their respective local NLU 779. For instance, a first NMD 703*a* and a second NMD 703*a* may share data representing the libraries of their respective local NLU 779, possibly using a network (e.g., the network 904). Such sharing may facilitate the NMDs 703*a* being able to respond to voice input similarly, among other possible benefits.

In some embodiments, one or more of the components described above can operate in conjunction with the microphones 720 to detect and store a user's voice profile, which may be associated with a user account of the MPS 100. In some embodiments, voice profiles may be stored as and/or compared to variables stored in a set of command information or data table. The voice profile may include aspects of the tone or frequency of a user's voice and/or other unique aspects of the user, such as those described in previously-referenced U.S. patent application Ser. No. 15/438,749.

In some embodiments, one or more of the components described above can operate in conjunction with the microphones 720 to determine the location of a user in the home environment and/or relative to a location of one or more of the NMDs 103. Techniques for determining the location or proximity of a user may include one or more techniques disclosed in previously-referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is herein incorporated by reference in its entirety.

IV. Example Command Keyword Techniques

Figure 12:
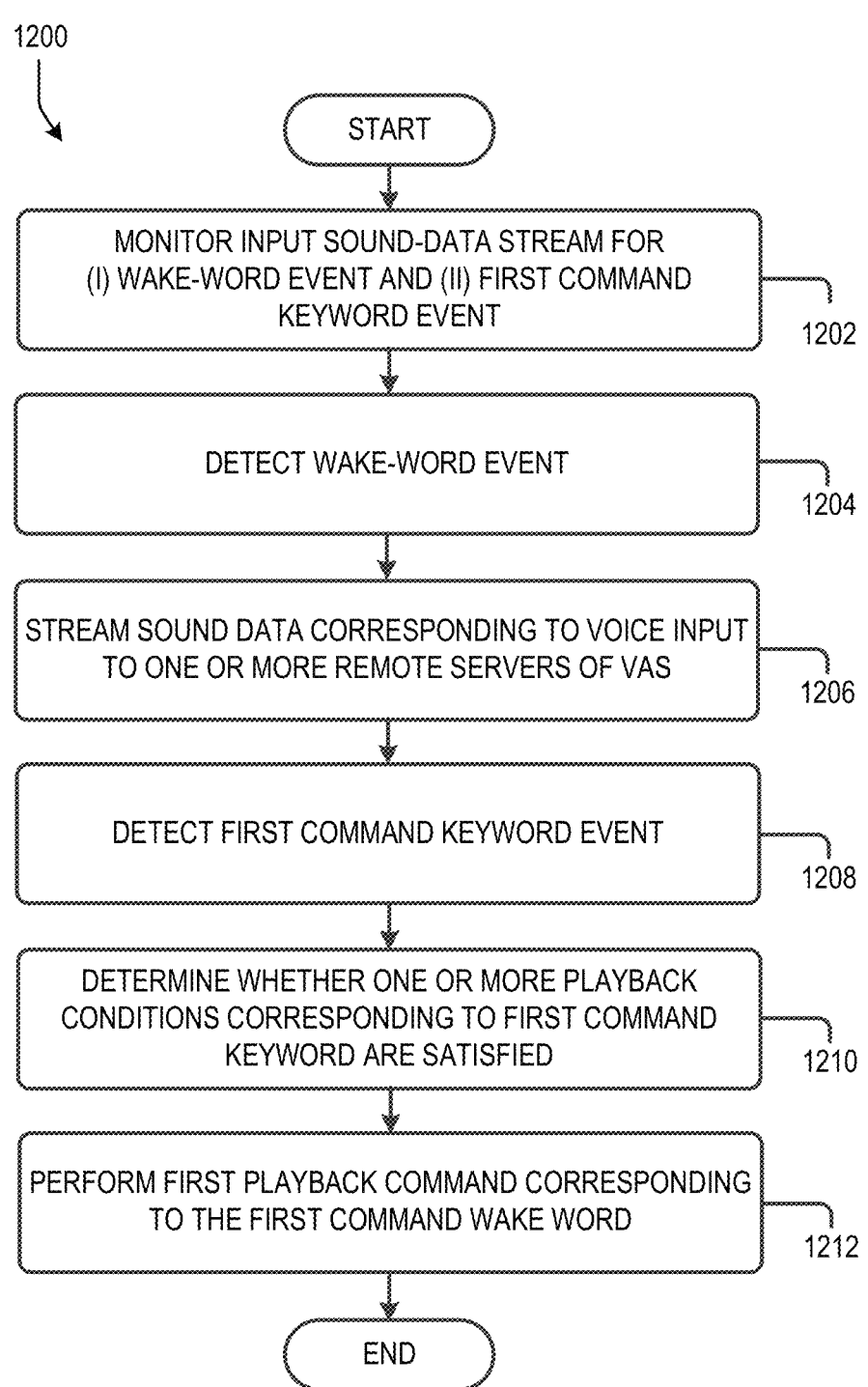
FIG. 12 is a flow diagram of an example method to perform an operation based on a command keyword in accordance with aspects of the disclosure.

FIG. 12 is a flow diagram showing an example method 1200 to perform a first playback command based on a command keyword event. The method 1100 may be performed by a networked microphone device, such as the NMD 103s (FIG. 1A), which may include features of the NMD 703a (FIG. 7A). In some implementations, the NMD is implemented within a playback device, as illustrated by the playback device 102r (FIG. 1G).

At block 1202, the method 1200 involves monitoring an input sound-data stream for (i) a wake-word event and (ii) a first command keyword event. For instance, the VAS wake-word engine 770a of the NMD 703a may apply one or more wake-word identification algorithms to the sound-data stream $S_{DS}$ (FIG. 7A). Further, the command keyword engine 770 may monitor the sound-data stream $S_{DS}$ for command keywords, perhaps using the ASR 772 and local NLU 779, as described above in connection with FIG. 7A.

At block 1204, the method 1200 involves detecting a wake-word event. Detecting the wake word event may involve the VAS wake-word engine 770a of the NMD 703a detecting a first sound detected via the microphone(s) 720 includes a first voice input comprising a wake word. The VAS wake-word engine 770a may detect such a wake word in the first voice input using an identification algorithm.

At block 1206, the method 1200 involves streaming sound data corresponding to the first voice input to one or more remote servers of a voice assistant service. For example, the voice extractor 773 may extract at least a portion (e.g., a wake word portion and/or a voice utterance portion) of the first voice input from the sound-data stream $S_{DS}$ (FIG. 7A). The NMD 703 may then stream this extracted data to one or more remote servers of a voice assistant service via the network interface 724.

At block 1208, the method 1200 involves detecting a first command keyword event. For example, after detecting a second sound, the command keyword engine 771a of the NMD 703a may detect a first command keyword in the sound-data stream $S_D$ corresponding to a second voice input in the second sound. Other examples are possible as well.

At block 1210, the method 1200 involves determining whether one or more playback conditions corresponding to the first command keyword are satisfied. Determining whether the one or more playback conditions corresponding to the first command keyword are satisfied may involve determining a state of a state machine. For instance, the state machine(s) 775 of the NMD 703a may transition to a first state when the one or more playback conditions corresponding to the first command keyword are satisfied and transition to a second state when at least one condition of the one or more playback conditions corresponding to the first command keyword are not satisfied (FIG. 7C). Example playback conditions are illustrated in table 985 (FIGS. 9A and 9B).

At block 1212, the method 1200 involves performing a first playback command corresponding to the first command keyword. For instance, the NMD 703a may perform the first playback command based on detecting the first command keyword event and determining that the one or more playback conditions corresponding to the first command keyword are satisfied. Within examples, performing the first playback command may involve generating one or more instructions to perform the command, which cause the target playback device(s) to perform the first playback command.

Within examples, the target playback device(s) 102 to perform the first playback command may be explicitly or implicitly defined. For example, the target playback devices 102 may be explicitly defined by reference in the voice input 780 to the name(s) of one or more playback devices (e.g., by reference to a zone or zone group name). Alternatively, the voice input might not include any reference to the name(s) of one or more playback devices and instead may implicitly refer to playback device(s) 102 associated with the NMD 703a. Playback devices 102 associated with the NMD 703a may include a playback device implementing the NMD 703a, as illustrated by the playback device 102d implementing the NMD 103d (FIG. 1B)) or playback devices configured to be associated (e.g., where the playback devices 102 are in the same room or area as the NMD 703a).

Within examples, performing the first playback operation may involve transmitting one or more instructions over one or more networks. For instance, the NMD 703a may transmit instructions locally over the network 903 to one or more playback devices 102 to perform instructions such as transport control (FIG. 10), similar to the message exchange illustrated in FIG. 6. Further, the NMD 703a may transmit requests to the streaming audio service service(s) 906b to stream one or more audio tracks to the target playback device(s) 102 for playback over the links 903 (FIG. 10). Alternatively, the instructions may be provided internally (e.g., over a local bus or other interconnection system) to one or more software or hardware components (e.g., the electronics 112 of the playback device 102).

Yet further, transmitting instructions may involve both local and cloud based operations. For instance, the NMD 703a may transmit instructions locally over the network 903 to one or more playback devices 102 to add one or more audio tracks to the playback queue over the network 903. Then, the one or more playback devices 102 may transmit a request to the streaming audio service service(s) 906b to stream one or more audio tracks to the target playback device(s) 102 for playback over the links 903. Other examples are possible as well.

Figure 13:
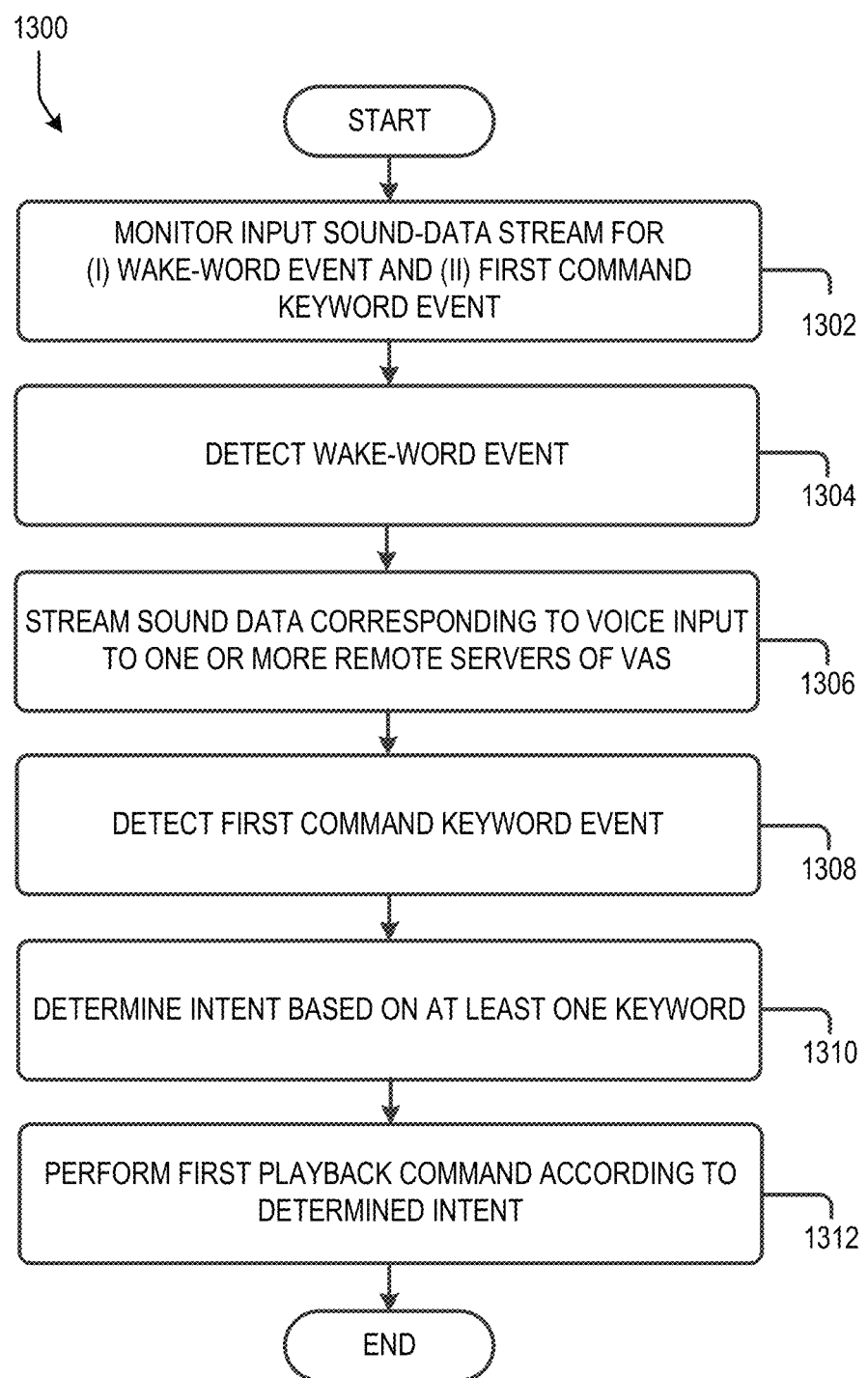
FIG. 13 is a flow diagram of an example method to perform an operation based on a command keyword in accordance with aspects of the disclosure.

FIG. 13 is a flow diagram showing an example method 1300 to perform a first playback command according to one or more parameters based on a command keyword event. Similar to the method 1100, the method 1300 may be performed by a networked microphone device, such as the NMD 120 (FIG. 1A), which may include features of the NMD 703a (FIG. 7A). In some implementations, the NMD is implemented within a playback device, as illustrated by the playback device 102r (FIG. 1G).

At block 1302, the method 1300 involves monitoring an input sound-data stream for (i) a wake-word event and (ii) a first command keyword event. For instance, the VAS wake-word engine 770a of the NMD 703a may apply one or more wake-word identification algorithms to the sound-data stream $S_{DS}$ (FIG. 7A). Further, the command keyword engine 770 may monitor the sound-data stream $S_{DS}$ for command keywords, perhaps using the ASR 772 and local NLU 779, as described above in connection with FIG. 7A.

At block 1304, the method 1300 involves detecting a wake-word event. Detecting the wake word event may involve the VAS wake-word engine 770a of the NMD 703a detecting a first sound detected via the microphone(s) 720 includes a first voice input comprising a wake word. The VAS wake-word engine 770a may detect such a wake word in the first voice input using an identification algorithm.

At block 1306, the method 1300 involves streaming sound data corresponding to the first voice input to one or more remote servers of a voice assistant service. For example, the voice extractor 773 may extract at least a portion (e.g., a wake word portion and/or a voice utterance portion) of the first voice input from the sound-data stream $S_{DS}$ (FIG. 7A). The NMD 703 may then stream this extracted data to one or more remote servers of a voice assistant service via the network interface 724.

At block 1308, the method 1300 involves detecting a first command keyword event. For example, after detecting a second sound, the command keyword engine 771a of the NMD 703a may detect a first command keyword in the sound-data stream $S_D$ corresponding to a second voice input in the second sound (FIG. 7A). Further, the local NLU 779 may detect that the second voice input includes at least one keyword from the library of the local NLU 779. For example, the local NLU 779 may determine whether the voice input includes any keywords matching keywords in the library of the local NLU 779. The local NLU 779 is configured to analyze the signal $S_{ASR}$ to spot (i.e., detect or identify) keywords in the voice input.

At block 1310, the method 1300 involves determining an intent based on the at least one keyword. For instance, the local NLU 779 may determine an intent from one or more keyword in the second voice input. As indicated above, the keywords in the library of the local NLU 779 correspond to parameters. The keyword(s) in a voice input may indicate an intent, such as to play particular audio content in a particular zone.

At block 1312, the method 1300 involves performing a first playback command according to the determined intent. Within examples, performing the first playback command may involve generating one or more instructions to perform the command according to the determined intent, which cause the target playback device(s) to perform the first playback command customized by the parameter(s) in the voice utterance portion of the voice input. As indicated above in connection with block 1212 (FIG. 12), the target playback device(s) 102 that will perform the first playback command may be explicitly or implicitly defined. Further, performing the first playback operation may involve transmitting one or more instructions over one or more networks or may involve providing the instructions internally (e.g., to playback device components).

Figure 14:
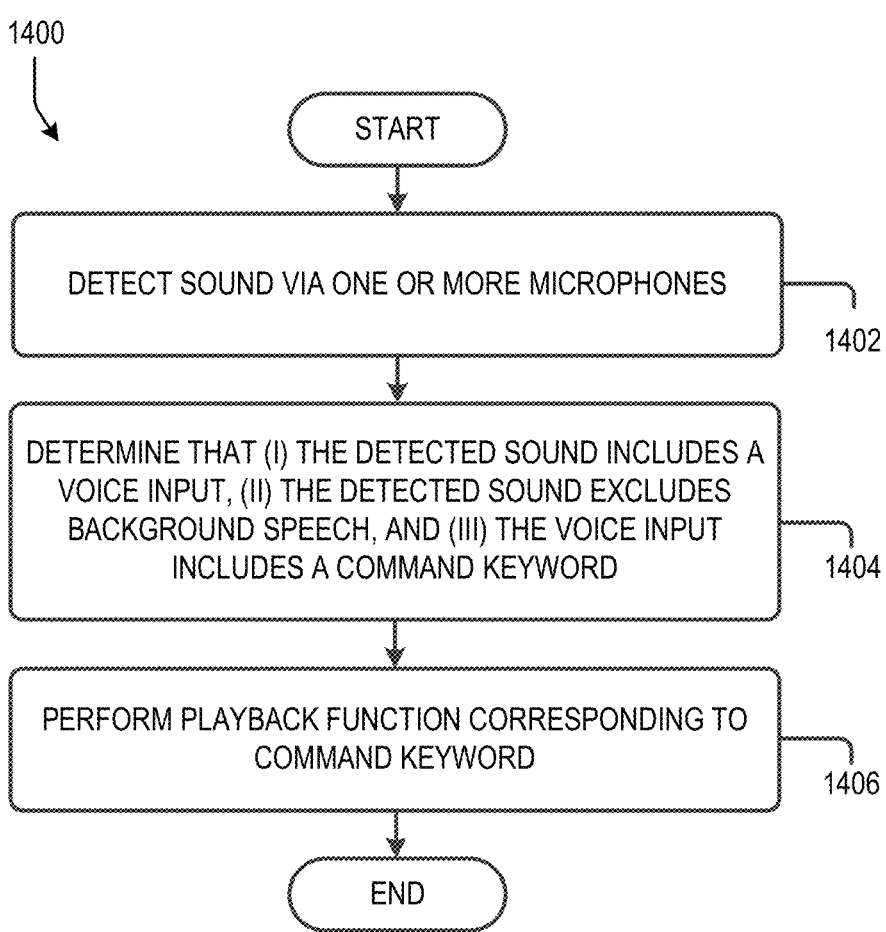
FIG. 14 is a flow diagram of an example method to perform an operation based on a command keyword in accordance with aspects of the disclosure.

FIG. 14 is a flow diagram showing an example method 1400 to perform a first playback command according to one or more parameters based on a command keyword event corresponding to a command keyword. The command keyword event may be generated only when certain conditions are met. A first condition is that background speech was not present in the environment when the command keyword was detected.

Similar to the methods 1200 and 1300, the method 1400 may be performed by a networked microphone device, such as the NMD 120 (FIG. 1A), which may include features of the NMD 703a (FIG. 7A). In some implementations, the NMD is implemented within a playback device, as illustrated by the playback device 102r (FIG. 1G).

At block 1402, the method 1400 involves detecting sound via one or more microphones. For instance, the NMD 703 may detect sound via the microphones 720 (FIG. 7A). Further, the NMD 703 may process the detected sound using one or more components of the VCC 760.

At block 1404, the method 1400 involves determining that (i) the detected sound includes a voice input, (ii) the detected sound excludes background speech, and (iii) the voice input includes a command keyword.

For instance, to determine whether the detected sound includes a voice input, the voice activity detector 765 may analyze the detected sound to determine a presence (or lack thereof) of voice activity in the sound-data stream $S_{DS}$ (FIG. 7A). Further, to determine whether the detected sound excludes background speech, the noise classifier 766 may analyze sound metadata corresponding to the detected sound and determine whether the sound metadata includes features corresponding to background speech.

Yet further, to determine whether the voice input includes a command keyword, the command keyword engine 771a may analyze the sound-data stream $S_{DS}$ (FIG. 7A). In particular, the ASR 772 may transcribe the sound-data stream $S_{DS}$ to text (e.g., the signal $S_{ASR}$) and the local NLU 779 may determine that words matching a command keyword are in the transcribed text. In other examples, the command keyword engine 771a may use one or more keyword identification algorithms on the sound-data stream Sm. Other examples are possible as well.

At block 1406, the method 1400 involves performing a playback function corresponding to the command keyword. For instance, the NMD may perform the playback function based on determining (i) the detected sound includes the voice input, (ii) the detected sound excludes background speech, and (iii) the voice input includes the command keyword. Blocks 1212 and 1312 of FIGS. 12 and 13, respectively, provide examples of performing a playback function.

V. Illustrative Examples

FIGS. 15A, 15B, 15C, and 15D show exemplary input and output from an example NMD configured in accordance with aspects of the disclosure.

FIG. 15A illustrates a first scenario in which a wake-word engine of the NMD is configured to detect three command keywords ("play", "stop", and "resume"). The local NLU is disabled. In this scenario, the user has spoken the voice input "play" to the NMD, which triggers a new recognition of one of the command keywords (e.g., a command keyword event corresponding to play).

Yet further, a voice activity detector (VAD) and a noise classifier have analyzed 150 frames of a pre-roll portion of the voice input. As shown, the VAD has detected voice in 140 frames of the 150 pre-roll frames, which indicates that a voice input may be present in the detected sound. Further, the noise classifier has detected ambient noise in 11 frames, background speech in 127 frames, and fan noise in 12 frames. In this NMD, the noise classifier is classifying the predominant noise source in each frame. This indicates the presence of background speech. As a result, the NMD has determined not to trigger on the detected command keyword "play."

FIG. 15B illustrates a second scenario in which a wake-word engine of the NMD is configured to detect a command keyword ("play") as well as two cognates of that command keyword ("play something" and "play me a song"). The local NLU is disabled. In this second scenario, the user has spoken the voice input "play something" to the NMD, which triggers a new recognition of one of the command keywords (e.g., a command keyword event).

Yet further, a voice activity detector (VAD) and a noise classifier have analyzed 150 frames of a pre-roll portion of the voice input. As shown, the VAD has detected voice in 87 frames of the 150 pre-roll frames, which indicates that a voice input may be present in the detected sound. Further, the noise classifier has detected ambient noise in 18 frames, background speech in 8 frames, and fan noise in 124 frames. This indicates that background speech is not present. Given the foregoing, the NMD has determined to trigger on the detected command keyword "play."

FIG. 15C illustrates a third scenario in which a wakeword engine of the NMD is configured to detect three command keywords ("play", "stop", and "resume"). The local NLU is enabled. In this third scenario, the user has spoken the voice input "play Beatles in the Kitchen" to the NMD, which triggers a new recognition of one of the command keywords (e.g., a command keyword event corresponding to play).

As shown, the ASR has transcribed the voice input as "play beet les in the kitchen." Some error in performing ASR is expected (e.g., "beet les"). Here, the local NLU has matched the keyword "beet les" to "The Beatles" in the local NLU library, which sets up this artist as a content parameter to the play command. Further, the local NLU has also matched the keyword "kitchen" to "kitchen" in the local NLU library, which sets up the kitchen zone as a target parameter to the play command. The local NLU produced a confidence score of 0.63428231948273443 associated with the intent determination.

Here as well, a voice activity detector (VAD) and a noise classifier have analyzed 150 frames of a pre-roll portion of the voice input. As shown, the noise classifier has detected ambient noise in 142 frames, background speech in 8 frames, and fan noise in 0 frames. This indicates that background speech is not present. The VAD has detected voice in 112 frames of the 150 pre-roll frames, which indicates that a voice input may be present in the detected sound. Here, the NMD has determined to trigger on the detected command keyword "play."

Yet further, a voice activity detector (VAD) and a noise classifier have analyzed 150 frames of a pre-roll portion of the voice input. As shown, the VAD has detected voice in 140 frames of the 150 pre-roll frames, which indicates that a voice input may be present in the detected sound. Further, the noise classifier has detected ambient noise in 11 frames, background speech in 127 frames, and fan noise in 12 frames This indicates the presence of background speech. As a result, the NMD has determined not to trigger on the detected command keyword "play."

FIG. 15D illustrates a fourth scenario in which a keyword engine of the NMD is not configured to spot any command keywords. Rather, the keyword engine will perform ASR and pass the output of the ASR to the local NLU. The local NLU is enabled and configured to detect keywords corresponding to both commands and parameters. In the fourth scenario, the user has spoken the voice input "play some music in the Office" to the NMD.

As shown, the ASR has transcribed the voice input as "lay some music in the office." Here, the local NLU has matched the keyword "lay" to "play" in the local NLU library, which corresponds to a playback command. Further, the local NLU has also matched the keyword "office" to "office" in the local NLU library, which sets up the office zone as a target parameter to the play command. The local NLU produced a confidence score of 0.14620494842529297 associated with the keyword matching. In some examples, this low confidence score may cause the NMD to not accept the voice input (e.g., if this confidence score is below a threshold, such as 0.5).

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method to be performed by a playback device comprising a network interface and at least one microphone configured to detect sound, the method comprising monitoring an input sound-data stream representing the sound detected by the at least one microphone for (i) a wake-word event and (ii) a first command keyword event; detecting the wake-word event, wherein detecting the wake-word event comprises after detecting a first sound via the one or more microphones, determining that the detected first sound includes a first voice input comprising a wake word; streaming, via the network interface, sound data corresponding to at least a portion of the first voice input to one or more remote servers of a voice assistant service; detecting the first command keyword event, wherein detecting the first command keyword event comprises after detecting a second sound via the one or more microphones, determining that the detected second sound includes a second voice input comprising a first command keyword, wherein the first command keyword is one of a plurality of command keywords supported by the playback device; determining that one or more playback conditions corresponding to the first command keyword are satisfied; and in response to detecting the first command keyword event and determining that the one or more playback conditions corresponding to the first command keyword are satisfied, performing a first playback command corresponding to the first command keyword.

Example 2: The method of Example 1, further comprising: after detecting the first command keyword event, detecting a subsequent first command keyword event, wherein detecting the subsequent first command keyword event comprises after detecting a third sound via the at least one microphone determining that the third sound includes a third voice input comprising the first command keyword; determining that at least one playback condition of the one or more playback conditions corresponding to the first command keyword is not satisfied; and in response to determining that the at least one playback condition is not satisfied, forgoing the performing of the first playback command corresponding to the first command keyword.

Example 3: The method of any of Examples 1 and 2, further comprising: detecting a second command keyword event, wherein detecting the second command keyword event comprises after detecting a third sound via the at least one microphone, determining that the third sound includes a third voice input comprising a second command keyword in the detected third sound; determining that one or more playback conditions corresponding to the second command keyword are satisfied; and in response to detecting the second command keyword event and determining that the one or more playback conditions corresponding to the second command keyword are satisfied, performing a second playback command corresponding to the second command keyword.

Example 4: The method of Example 3, wherein at least one playback condition of the one or more playback conditions corresponding to the second command keyword is not a playback condition of the one or more playback conditions corresponding to the first command keyword.

Example 5: The method of any of Examples 1-4, wherein the first command keyword is a skip command, wherein the one or more playback conditions corresponding to the first command keyword comprise (i) a first condition that a media item is being played back on the playback device, (ii) a second condition that a queue is active on the playback device, and (iii) a third condition that the queue includes a media item subsequent to the media item being played back on the playback device, and wherein performing the first playback command corresponding to the first command keyword comprises skipping forward in the queue to play back the media item subsequent to the media item being played back on the playback device.

Example 6: The method of any of Examples 1-4, wherein the first command keyword is a pause command, wherein the one or more playback conditions corresponding to the first command keyword comprise a condition that audio content is being played back on the playback device, and wherein performing the first playback command corresponding to the first command keyword comprises pausing playback of audio content on the playback device.

Example 7: The method of any of Examples 1-4, wherein the first command keyword is a volume increase command, wherein the one or more playback conditions corresponding to the first command keyword comprise a first condition that audio content is being played back on the playback device and a second condition that a volume level on the playback device is not at maximum volume level, wherein performing the first playback command corresponding to the first command keyword comprises increasing the volume level on the playback device.

Example 8: The method of any of Examples 1-8, wherein the one or more playback conditions corresponding to the first command keyword comprises a first condition of an absence of background speech in the detected first sound.

Example 9: A tangible, non-transitory, computer-readable medium having instructions stored thereon that are executable by one or more processors to cause a playback device to perform the method of any one of Examples 1-8.

Example 10: A playback device comprising a speaker, a network interface, one or more microphones configured to detect sound, one or more processors, and a tangible, non-tangible computer-readable medium having instructions stored thereon that are executable by the one or more processors to cause the playback device to perform the method of any of Examples 1-8.

Example 11: A method to be performed by a playback device comprising a network interface and at least one microphone configured to detect sound, the method comprising monitoring an input sound-data stream representing the sound detected by the at least one microphone for (i) a wake-word event and (ii) a first command keyword event; detecting the wake-word event, wherein detecting the wake-word event comprises after detecting a first sound via the one or more microphones, determining that that the detected first sound includes a first voice input comprising a wake word; streaming, via the network interface, sound data corresponding to at least a portion of the first voice input to one or more remote servers of a voice assistant service; detecting the first command keyword event, wherein detecting the first command keyword event comprises after detecting a second sound via the one or more microphones, determining that the detected second sound includes a second voice input comprising a first command keyword and at least one keyword, wherein the first command keyword is one of a plurality of command keywords supported by the playback device, and wherein the first command keyword corresponds to a first playback command; determining, via a local natural language unit (NLU), an intent based on the at least one keyword, wherein the NLU includes a predetermined library of keywords comprising the at least one keyword; and after (a) detecting the first command keyword event and (b) determining the intent, performing the first playback command according to the determined intent.

Example 12: The method of Example 11, wherein the method further comprises detecting a second command keyword event, wherein detecting the second command keyword event comprises after detecting a third sound via the at least one microphone, determining that the third sound includes a third voice input comprising the second command keyword; determining that the third voice input comprising the second command keyword does not include at least one other keyword from the pre-determined library of keywords; and after determining that the third voice input comprising the second command keyword does not include the at one least keyword from the pre-determined library of keywords, streaming sound data representing at least a portion of the voice input comprising the second command keyword to one or more servers of the voice assistant service for processing by the one or more remote servers of the voice assistance service.

Example 13: The method of Example 12, wherein the method further comprises playing back an audio prompt to request confirmation for invoking the voice assistant service to process the second command keyword; and after playing back the audio prompt, receiving data representing confirmation to invoke the voice assistant service for processing the second command keyword, wherein streaming the sound data representing at least a portion of the voice input comprising the second command keyword to one or more servers of the voice assistant service occurs only after receiving the data representing confirmation to invoke the voice assistant service.

Example 14: The method of any of Examples 10-13, further comprising detecting a second command keyword event, wherein detecting the second command keyword event comprises after detecting a third sound via the at least one microphone, determining that the third sound includes a third voice input comprising the second command keyword; determining that the third voice input comprising the second command keyword does not include at least one other keyword from the pre-determined library of keywords; and after determining that the third voice input comprising the second command keyword does not include the at one least keyword from the pre-determined library of keywords, performing the first playback command according to one or more default parameters.

Example 15: The method of any of Examples 10-14, wherein a first keyword of the at least one keyword in the detected second sound represents a zone name corresponding to a first zone of a media playback system, wherein performing the first playback command according to the determined intent comprises sending one or more instructions to perform the first playback command in the first zone, and wherein the media playback system comprises the playback device.

Example 16: The method of any of examples 10-15, further comprising populating the pre-determined library of keywords with zones names corresponding to respective zones within the media playback system, wherein each zone comprises one or more respective playback devices, and wherein the pre-determined library of keywords is populated with the zone name corresponding to the first zone of the media playback system.

Example 17: The method of any of Examples 10-16, further comprising discovering, via the network interface, smart home devices connected to a local area network; and populating the pre-determined library of keywords with names corresponding to respective smart home devices discovered on the local area network.

Example 18: The method of any of Examples 10-17, wherein a media playback system comprises the playback device, wherein the media playback system is registered to one or more user profiles, and wherein the functions further comprise: populating the pre-determined library of keywords with names corresponding to playlists that are designated as favorites by the one or more user profiles.

Example 19: The method of Example 18, wherein a first user profile of the one or more user profiles is associated with a user account of a first streaming audio service and a user account of a second streaming audio service, and wherein the playlists comprise a first playlist of a first streaming audio service designated as a favorite by the user account of the first streaming audio service and a second playlist comprising audio tracks from the first streaming audio service and the second streaming audio service.

Example 20: The method of any of Examples 10-16, wherein detecting the first command keyword event further comprises determining that one or more playback conditions corresponding to the first command keyword are satisfied.

Example 21: The method of Example 20, wherein the one or more playback conditions corresponding to the first command keyword comprises a first condition of an absence of background speech in the detected first sound.

Example 22: A tangible, non-transitory, computer-readable medium having instructions stored thereon that are executable by one or more processors to cause a playback device to perform the method of any one of Examples 10-21.

Example 23: A playback device comprising a speaker, a network interface, one or more microphones configured to detect sound, one or more processors, and a tangible, non-tangible computer-readable medium having instructions stored thereon that are executable by the one or more processors to cause the playback device to perform the method of any of Examples 10-21.

Example 24: A method to be performed by a playback device comprising a network interface and at least one microphone configured to detect sound, the method comprising detecting a sound via the one or more microphones; determining that (i) the detected sound includes a voice input, (ii) the detected sound excludes background speech, and (iii) the voice input includes a command keyword; and in response to determining (i) the detected sound includes a voice input, (ii) the detected sound excludes background speech, and (iii) the voice input includes a command keyword, performing a playback function corresponding to the command keyword.

Example 25: The method of Example 24, wherein the detected sound is a first detected sound, and wherein the method further comprises detecting a second sound via the at least one microphone; determining that the detected second sound includes a wake word; and after determining that the detected second sound includes the wake word, streaming, via a network interface of the playback device, voice input in the detected second sound to one or more remote servers of a voice assistant service.

Example 26: The method of any of Example 24 and Example 25, wherein determining that there is an absence of background speech in the detected second sound comprises: determining sound metadata corresponding to the detected sound; and analyzing the sound metadata to classify the detected sound according to one or more particular signatures selected from a plurality of signatures, wherein each signature of the plurality of signatures is associated with a noise source, and wherein at least one of the signatures of the plurality of signatures is a background speech signature indicative of background speech.

Example 27: The method of Example 26, wherein analyzing the sound metadata comprises: classifying frames associated with the detected sound as having a particular speech signature other than the background speech signature; and comparing a number of frames, if any, classified with the background speech signature to a number of frames classified with a signature other than the background speech signature.

Example 28: The method of any one of Example 24 and Example 25, wherein determining that there is a voice input in the detected sound comprises detecting voice activity in the detected sound.

Example 29: The method of Example 28, wherein detecting voice activity in the detected sound comprises: determining a number of first frames associated with the detected sound as containing speech; and comparing the number of first frames to a number of second frames that are (a) associated with the detected sound and (b) not indicative of speech.

Example 30: The method of Example 29, wherein the first frames comprise one or more frames generated in response to near-field voice activity and one or more frames generated in response to far-field voice activity.

Example 31: A tangible, non-transitory, computer-readable medium having instructions stored thereon that are executable by one or more processors to cause a playback device to perform the method of any one of Examples 24-30.

Example 32: A playback device comprising one or more microphones configured to detect sound, one or more processors, and a tangible, non-tangible computer-readable medium having instructions stored thereon that are executable by the one or more processors to cause the playback device to perform the method of any of Examples 24-30.

The invention claimed is:

1. A playback device comprising:
at least one microphone;
at least one speaker;
a network interface;
at least one processor; and
at least one non-transitory computer-readable medium comprising program instructions that are executable by the at least one processor such that the playback device is configured to:
  capture an input sound-data stream representing sound detected by the at least one microphone;
  monitor voice input states for first conditions indicative of imminent voice input, wherein the voice input states comprise a voice activity state and a voice classification state, and wherein the program instructions that are executable by the at least one processor such that the playback device is configured to monitor voice input states for the first conditions indicative of imminent voice input comprise program instructions that are executable by the at least one processor such that the playback device is configured to:
    (i) monitor the voice activity state for a particular first condition that is satisfied when a voice activity detector detects that voice activity is present in the input sound-data stream; and
    (ii) monitor the voice classification state for another particular first condition that is satisfied when a noise classifier classifies audio in the input sound-data stream as far-field speech;
  when the first conditions indicative of imminent voice input are concurrently satisfied, enable monitoring of the input sound-data stream for voice inputs, wherein monitoring of the input sound-data stream is disabled when at least a threshold number of the monitored voice input states are in second conditions that are not indicative of the imminent voice input, wherein a particular second condition is satisfied when the voice activity detector does not detect that voice activity is present in the input sound-data stream, and wherein another particular second condition is satisfied when the noise classifier classifies audio in the input sound-data stream as background speech;
  when a voice input is detected in the monitored input sound-data stream, determine (i) an intent of the voice input from among a plurality of locally-processable intents and (ii) a confidence value of the determined intent, wherein the locally-processable intents correspond to respective playback commands, and wherein the locally-processable intents are a subset of intents that are processable by the playback device; and
  when the confidence value of the determined intent is at least a threshold confidence, perform a particular playback command corresponding to the determined intent, wherein the playback device foregoes performing the particular playback command when the confidence value is below the threshold confidence.

2. The playback device of claim 1, wherein the program instructions that are executable by the at least one processor such that the playback device is configured to determine the intent of the voice input comprise program instructions that are executable by the at least one processor such that the playback device is configured to:
  detect, in the voice input, one or more command keywords corresponding to the particular playback command.

3. The playback device of claim 1, wherein the program instructions that are executable by the at least one processor such that the playback device is configured to determine the intent of the voice input comprise program instructions that are executable by the at least one processor such that the playback device is configured to:
  detect one or more keywords in the voice input that suggest a particular intent corresponding to the particular playback command in the voice input.

4. The playback device of claim 1, wherein the at least one non-transitory computer-readable medium further comprises program instructions that are executable by the at least one processor such that the playback device is configured to:
  while monitoring the voice input states for the first conditions indicative of imminent voice input, monitor the input sound-data stream for a wake word of a voice assistant service configured to determine cloud-processable intents, wherein the cloud-processable intents include additional intents relative to the locally-processable intents;
  detect an instance of the wake word in a portion of the input sound-data stream that comprises an additional voice input; and
  send, via the network interface, sound data corresponding to the additional voice input to one or more servers of the voice assistant service for processing of the additional voice input.

5. The playback device of claim 1, wherein the voice input states further comprise a voice pattern state, and wherein the program instructions that are executable by the at least one processor such that the playback device is configured to monitor voice input states for the first conditions indicative of imminent voice input comprise program instructions that are executable by the at least one processor such that the playback device is configured to:
  monitor the voice pattern state for a particular first condition that is satisfied when a keyword engine detects a particular pattern corresponding to one or more keywords in the input sound-data stream.

6. The playback device of claim 1, wherein the particular playback command comprises a volume adjustment command, and wherein the program instructions that are executable by the at least one processor such that the playback device is configured to perform the particular playback command corresponding to the determined intent comprise program instructions that are executable by the at least one processor such that the playback device is configured to:
  modify a volume setting of the playback device according to the volume adjustment command.

7. The playback device of claim 1, wherein the particular playback command comprises a media transport command, and wherein the program instructions that are executable by the at least one processor such that the playback device is configured to perform the particular playback command corresponding to the determined intent comprise program instructions that are executable by the at least one processor such that the playback device is configured to:

modify playback by the playback device according to the media transport command.

8. The playback device of claim 1, wherein the playback device is configured in a synchrony group with one or more additional playback devices, and wherein the program instructions that are executable by the at least one processor such that the playback device is configured to perform the particular playback command corresponding to the determined intent comprise program instructions that are executable by the at least one processor such that the playback device is configured to:

cause the one or more additional playback devices to perform the particular playback command.

9. The playback device of claim 1, wherein the program instructions that are executable by the at least one processor such that the playback device is configured to perform the particular playback command corresponding to the determined intent comprise program instructions that are executable by the at least one processor such that the playback device is configured to:

perform the particular playback command corresponding to the determined intent when (i) the confidence value of the determined intent is at least the threshold confidence and (ii) one or more playback conditions are satisfied such that that playback is in a state where the particular playback command could be performed.

10. The playback device of claim 1, wherein when the playback device foregoes performing the particular playback command when the confidence value is below the threshold confidence, the playback device sends data corresponding to the voice input to one or more servers of a voice assistant service for processing of the voice input.

11. A system comprising:

a playback device comprising:

at least one microphone;

at least one speaker;

a network interface;

at least one processor; and at least one non-transitory computer-readable medium comprising program instructions that are executable by the at least one processor such that the system is configured to:

capture an input sound-data stream representing sound detected by the at least one microphone;

monitor voice input states for first conditions indicative of imminent voice input, wherein the voice input states comprise a voice activity state and a voice classification state, and wherein the program instructions that are executable by the at least one processor such that the system is configured to monitor voice input states for the first conditions indicative of imminent voice input comprise program instructions that are executable by the at least one processor such that the system is configured to:

(i) monitor the voice activity state for a particular first condition that is satisfied when a voice activity detector detects that voice activity is present in the input sound-data stream; and (ii) monitor the voice classification state for a particular first condition that is satisfied when a noise classifier classifies audio in the input sound-data stream as far-field speech, wherein a particular second condition is satisfied when the noise classifier classifies audio in the input sound-data stream as background speech;

when the first conditions indicative of imminent voice input are concurrently satisfied, enable monitoring of the input sound-data stream for voice inputs, wherein monitoring of the input sound-data stream is disabled when at least a threshold number of the monitored voice input states are in second conditions that are not indicative of the imminent voice input;

when a voice input is detected in the monitored input sound-data stream, determine (i) an intent of the voice input from among a plurality of locally-processable intents and (ii) a confidence value of the determined intent, wherein the locally-processable intents correspond to respective playback commands, and wherein the locally-processable intents are a subset of intents that are processable by the playback device; and when the confidence value of the determined intent is at least a threshold confidence, perform a particular playback command corresponding to the determined intent, wherein the playback device foregoes performing the particular playback command when the confidence value is below the threshold confidence.

12. The system of claim 11, wherein the program instructions that are executable by the at least one processor such that the system is configured to determine the intent of the voice input comprise program instructions that are executable by the at least one processor such that the system is configured to:

detect, in the voice input, one or more command keywords corresponding to the particular playback command.

13. The system of claim 11, wherein the program instructions that are executable by the at least one processor such that the system is configured to determine the intent of the voice input comprise program instructions that are executable by the at least one processor such that the system is configured to:

detect one or more keywords in the voice input that suggest a particular intent corresponding to the particular playback command in the voice input.

14. The system of claim 11, wherein the at least one non-transitory computer-readable medium further comprises program instructions that are executable by the at least one processor such that the system is configured to:

while monitoring the voice input states for the first conditions indicative of imminent voice input, monitor the input sound-data stream for a wake word of a voice assistant service configured to determine cloud-processable intents, wherein the cloud-processable intents include additional intents relative to the locally-processable intents;

detect an instance of the wake word in a portion of the input sound-data stream that comprises an additional voice input; and send, via the network interface, sound data corresponding to the additional voice input to one or more servers of the voice assistant service for processing of the additional voice input.

15. The system of claim 11, wherein the voice input states further comprise a voice pattern state, and wherein program instructions that are executable by the at least one processor such that the system is configured to monitor voice input states for the first conditions indicative of imminent voice input comprise program instructions that are executable by the at least one processor such that the system is configured to:

monitor the voice pattern state for a particular first condition that is satisfied when a keyword engine detects a particular pattern corresponding to one or more keywords in the input sound-data stream.

16. The system of claim 11, wherein the particular playback command comprises a volume adjustment command, and wherein the program instructions that are executable by the at least one processor such that the system is configured to perform the particular playback command corresponding to the determined intent comprise program instructions that are executable by the at least one processor such that the system is configured to:

modify a volume setting of the playback device according to the volume adjustment command.

17. The system of claim 11, wherein the particular playback command comprises a media transport command, and wherein the program instructions that are executable by the at least one processor such that the system is configured to perform the particular playback command corresponding to the determined intent comprise program instructions that are executable by the at least one processor such that the system is configured to:

modify playback by the playback device according to the media transport command.

18. The system of claim 11, wherein the program instructions that are executable by the at least one processor such that the system is configured to perform the particular playback command corresponding to the determined intent comprise program instructions that are executable by the at least one processor such that the system is configured to:

perform the particular playback command corresponding to the determined intent when (i) the confidence value of the determined intent is at least the threshold confidence and (ii) one or more playback conditions are satisfied such that that playback is in a state where the particular playback command could be performed.

19. The system of claim 11, wherein when the playback device foregoes performing the particular playback command when the confidence value is below the threshold confidence, the playback device sends data corresponding to the voice input to one or more servers of a voice assistant service for processing of the voice input.

20. At least one non-transitory computer-readable medium comprising program instructions that are executable by at least one processor such that a playback device is configured to:

capture an input sound-data stream representing sound detected by at least one microphone;

monitor voice input states for first conditions indicative of imminent voice input, wherein the voice input states comprise a voice activity state and a voice classification state, and wherein the program instructions that are executable by the at least one processor such that the playback device is configured to monitor voice input states for the first conditions indicative of imminent voice input comprise program instructions that are executable by the at least one processor such that the playback device is configured to:

(i) monitor the voice activity state for a particular first condition that is satisfied when a voice activity detector detects that voice activity is present in the input sound-data stream; and (ii) monitor the voice classification state for a particular first condition that is satisfied when a noise classifier classifies audio in the input sound-data stream as far-field speech, wherein a particular second condition is satisfied when the noise classifier classifies audio in the input sound-data stream as background speech;

when the first conditions indicative of imminent voice input are concurrently satisfied, enable monitoring of the input sound-data stream for voice inputs, wherein monitoring of the input sound-data stream is disabled when at least a threshold number of the monitored voice input states are in second conditions that are not indicative of the imminent voice input;

when a voice input is detected in the monitored input sound-data stream, determine (i) an intent of the voice input from among a plurality of locally-processable intents and (ii) a confidence value of the determined intent, wherein the locally-processable intents correspond to respective playback commands, and wherein the locally-processable intents are a subset of intents that are processable by the playback device; and when the confidence value of the determined intent is at least a threshold confidence, perform a particular playback command corresponding to the determined intent, wherein the playback device foregoes performing the particular playback command when the confidence value is below the threshold confidence.

\* \* \* \* \*